US010198685B2

(12) United States Patent
Simon et al.

(10) Patent No.: US 10,198,685 B2
(45) Date of Patent: Feb. 5, 2019

(54) ELECTRONIC BADGE TO AUTHENTICATE AND TRACK INDUSTRIAL VEHICLE OPERATOR

(71) Applicant: Crown Equipment Corporation, New Bremen, OH (US)

(72) Inventors: Andreas Simon, Munich (DE); Juergen Buchmann, Pliening (DE); Lewis H. Manci, New Bremen, OH (US); Sebastian Sick, Vaterstetten (DE)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 15/631,567

(22) Filed: Jun. 23, 2017

(65) Prior Publication Data
US 2017/0372188 A1 Dec. 28, 2017

Related U.S. Application Data

(60) Provisional application No. 62/354,304, filed on Jun. 24, 2016.

(51) Int. Cl.
*G06K 19/077* (2006.01)
*G06Q 10/08* (2012.01)
(Continued)

(52) U.S. Cl.
CPC .......... *G06K 19/07762* (2013.01); *B66F 9/24* (2013.01); *B66F 17/003* (2013.01);
(Continued)

(58) Field of Classification Search
CPC ......... G06K 19/07762; G06Q 10/0833; G06Q 10/20; G06Q 10/00; G06Q 10/02;
(Continued)

(56) References Cited

U.S. PATENT DOCUMENTS 6,072,396 A 6/2000 Gaukel
6,496,806 B1 12/2002 Horwitz et al.
(Continued)

FOREIGN PATENT DOCUMENTS

AU 2014262244 A1 12/2014
CA 2617976 A1 7/2009
(Continued)

OTHER PUBLICATIONS

Van Der Haegen, D.; International Search Report and Written Opinion; International Application No. PCT/US2017/038962; dated Sep. 21, 2017; European Patent Office; Rijswijk, Netherlands.
(Continued)

*Primary Examiner* — Dionne H Pendleton
(74) *Attorney, Agent, or Firm* — Stevens & Showalter, LLP

(57) ABSTRACT

A system for controlling an industrial vehicle comprises an information linking device, a badge communicator, an operator badge, and a controller. The controller controls the industrial vehicle operating state by identifying that an operator possessing the operator badge has approached the industrial vehicle, communicating with the server via the information linking device to authenticate the operator as authorized to operate the industrial vehicle, and pairing the operator badge with the industrial vehicle upon determining that the operator is authorized to operate the industrial vehicle. Moreover, the controller controls the industrial vehicle operating state by controlling the industrial vehicle based upon a location of the operator badge relative to the industrial vehicle.

12 Claims, 20 Drawing Sheets

(51) Int. Cl.
  *G07C 5/00* (2006.01)
  *G06K 9/00* (2006.01)
  *G07C 9/00* (2006.01)
  *B66F 9/24* (2006.01)
  *B66F 17/00* (2006.01)

(52) U.S. Cl.
  CPC ..... *G06K 9/00362* (2013.01); *G06K 9/00369* (2013.01); *G06K 9/00832* (2013.01); *G06Q 10/0833* (2013.01); *G07C 5/008* (2013.01); *G07C 9/00166* (2013.01); *G07C 9/00111* (2013.01)

(58) Field of Classification Search
  CPC ...... G06Q 10/08; G06Q 10/087; G06Q 20/00; G06Q 20/145; G06Q 30/00; G06Q 30/012; G06Q 30/0265; G06Q 30/0633; G06Q 30/0639; G06Q 30/0645; G06Q 50/30; G07C 9/00111; G07C 5/008; G07C 2209/63; G07C 5/0808; G07C 9/00103; G07C 2009/00396; G07C 2009/00769; G07C 2009/00793; G07C 2009/0092; G07C 2209/62; G07C 5/00; G07C 5/08; G07C 5/0825; G07C 5/085; G07C 9/00079; G07C 9/00126; G07C 9/00158; G07C 9/00174; G07C 9/00309; G07C 9/00134; G07C 9/00166; G07C 2209/64; G07C 1/06; G07C 1/10; G07C 5/0858; G07C 5/0883; G06F 21/31; G06F 21/35
  See application file for complete search history.

(56) References Cited

U.S. PATENT DOCUMENTS

| | | |
|---|---|---|
| 6,998,985 B2 | 2/2006 | Reisman et al. |
| 7,038,573 B2 | 5/2006 | Bann |
| 7,123,149 B2 | 10/2006 | Nowak et al. |
| 7,151,979 B2 | 12/2006 | Andersen et al. |
| 7,307,595 B2 | 12/2007 | Schantz et al. |
| 7,323,991 B1 | 1/2008 | Eckert et al. |
| 7,394,380 B2 | 7/2008 | Ballin et al. |
| 7,412,326 B2 | 8/2008 | Yoshioka et al. |
| 7,589,616 B2 | 9/2009 | Klatsmanyi et al. |
| 8,120,482 B2 | 2/2012 | Ulrich |
| 8,248,263 B2 | 8/2012 | Shervey et al. |
| 8,326,451 B2 | 12/2012 | Schantz et al. |
| RE44,275 E | 6/2013 | Ghazarian |
| 8,648,709 B2 | 2/2014 | Gauger et al. |
| 8,718,860 B2 | 5/2014 | Waltz et al. |
| 8,990,011 B2 | 3/2015 | Zhao et al. |
| 9,104,537 B1 | 8/2015 | Penilla et al. |
| 9,152,832 B2 | 10/2015 | Royston et al. |
| 9,319,471 B2 | 4/2016 | Diem |
| 9,519,921 B2 | 12/2016 | Wei et al. |
| 9,547,945 B2 | 1/2017 | McCabe et al. |
| 9,760,853 B2 | 9/2017 | Rose |
| 9,876,693 B1 | 1/2018 | Davidson |
| 2003/0122652 A1 | 7/2003 | Himmelstein |
| 2004/0111454 A1 | 6/2004 | Sorensen |
| 2004/0174264 A1 | 9/2004 | Reisman et al. |
| 2005/0065861 A1 | 3/2005 | Bann |
| 2007/0233304 A1 | 10/2007 | Baginski et al. |
| 2008/0042836 A1 | 2/2008 | Christopher |
| 2008/0129446 A1* | 6/2008 | Vader ............. B60R 25/24 340/5.6 |
| 2008/0189000 A1 | 8/2008 | Duong |
| 2009/0326991 A1 | 12/2009 | Wei et al. |
| 2010/0283602 A1 | 11/2010 | Tsai et al. |
| 2010/0328073 A1 | 12/2010 | Nikitin et al. |
| 2011/0093134 A1 | 4/2011 | Emanuel et al. |
| 2011/0246156 A1 | 10/2011 | Zecha et al. |
| 2012/0239224 A1 | 9/2012 | McCabe et al. |
| 2013/0021145 A1 | 1/2013 | Boudy |
| 2014/0188576 A1 | 7/2014 | de Oliveira et al. |
| 2014/0297103 A1 | 10/2014 | Borland et al. |
| 2014/0309870 A1* | 10/2014 | Ricci ............. H04W 4/21 701/36 |
| 2015/0042454 A1* | 2/2015 | Lee ............. G07C 9/00182 340/5.72 |
| 2015/0142485 A1 | 5/2015 | Kiyama et al. |
| 2015/0279210 A1 | 10/2015 | Zafiroglu et al. |
| 2015/0353132 A1 | 12/2015 | Franganillo et al. |
| 2015/0375947 A1* | 12/2015 | Hochstein ............. B60Q 9/002 348/143 |
| 2016/0034924 A1 | 2/2016 | Sorenson |
| 2016/0041559 A1 | 2/2016 | Wellman et al. |
| 2016/0225203 A1* | 8/2016 | Asmar ............. G07C 9/00309 |
| 2016/0284185 A1* | 9/2016 | Maison ............. H04B 5/0025 |
| 2016/0335892 A1 | 11/2016 | Okada et al. |
| 2016/0371553 A1* | 12/2016 | Farnham, IV ...... G06F 3/04817 |
| 2017/0025020 A1 | 1/2017 | Liao et al. |
| 2017/0236344 A1* | 8/2017 | Murar ............. G07C 9/00007 340/5.61 |
| 2017/0254883 A1 | 9/2017 | Hamel et al. |
| 2017/0327112 A1 | 11/2017 | Yokoyama et al. |

FOREIGN PATENT DOCUMENTS

| | | |
|---|---|---|
| EP | 3035074 A1 | 6/2016 |
| GB | 2462590 A | 2/2010 |
| WO | 2008074008 A2 | 6/2008 |
| WO | 2015060674 A1 | 4/2015 |
| WO | 2015137991 A1 | 9/2015 |
| WO | 2016033233 A1 | 3/2016 |

OTHER PUBLICATIONS

Bruce Sheppard; International Search Report and Written Opinion; International Application No. PCT/US2017/038969; dated Sep. 28, 2017; European Patent Office; Rijswijk, Netherlands.

Mennerun, Steeve; International Search Report and Written Opinion; International Application No. PCT/US2017/038981; dated Oct. 11, 2017; European Patent Office; Rijswijk, Netherlands.

Bruce Sheppard; International Search Report and Written Opinion; International Application No. PCT/US2017/039000; dated Sep. 28, 2017; European Patent Office; Rijswijk, Netherlands.

Lewis H. Manci et al.; Specification and Drawings; U.S. Appl. No. 15/631,376, filed Jun. 23, 2017.

Juergen Buchmann et al.; Specification and Drawings; U.S. Appl. No. 15/631,431, filed Jun. 23, 2017.

Sebastian Sick et al.; Specification and Drawings; U.S. Appl. No. 15/631,456, filed Jun. 23, 2017.

Kan, Yuri; Office Action; U.S. Appl. No. 15/631,431; dated Jun. 18, 2018; U.S. Patent and Trademark Office; Alexandria, VA.

Tang, Son M.; Office Action; U.S. Appl. No. 15/631,376; dated May 10, 2018; U.S. Patent and Trademark Office; Alexandria, VA.

Pope, Daryl C.; Office Action; U.S. Appl. No. 15/631,456; dated Jul. 6, 2018; U.S. Patent and Trademark Office; Alexandra, VA.

Pope, Daryl C.; Notice of Allowance; U.S. Appl. No. 15/631,456, dated Nov. 13, 2018; U.S. Patent and Trademark Office; Alexandria, VA.

Kan, Yuri; Notice of Allowance; U.S. Appl. No. 15/631,431, dated Nov. 30, 2018; U.S. Patent and Trademark Office; Alexandria, VA.

* cited by examiner

600

| VEHICLE | ZONE 1 | ACTION | ZONE 2 | ACTION | ZONE 3 | ACTION |
|---------|--------|--------|--------|--------|--------|--------|
| RR-123 | 2 METERS | STOP+ LOG | 4 METERS +SPEED | VISUAL+ AUDIBLE WARNING +LOG | 16 METERS | LOG |
| ... | ... | ... | ... | ... | ... | ... |

FIG. 6

| BADGE ID | LOCATION | TIMESTAMP | VEHICLE THAT IDENTIFIED BADGE | ADDITIONAL |
|---|---|---|---|---|
| 123 | TOP OF AISLE 5 | 9:00 AM | RR-234 | RR-234 WORKING ON PICK ORDER 3 |
| 123 | TOP OF AISLE 6 | 9:05 AM | RR-345 | RR-345 HEADING TO LOADING DOCK |
| 123 | TOP OF AISLE 7 | 9:15 AM | CB-456 | CB-456 WORKING ON PICK ORDER 6 |
| ... | ... | ... | ... | ... |

FIG. 9

ELECTRONIC BADGE TO AUTHENTICATE AND TRACK INDUSTRIAL VEHICLE OPERATOR

CROSS REFERENCE TO RELATED APPLICATIONS

This application claims the benefit of U.S. Provisional Patent Application Ser. No. 62/354,304, filed Jun. 24, 2016, entitled ELECTRONIC BADGE TO AUTHENTICATE AND TRACK INDUSTRIAL VEHICLE OPERATOR, the disclosure of which is hereby incorporated herein by reference.

BACKGROUND

The present disclosure relates to electronic systems that collect information related to the operation and movement of electronic badges in industrial applications, and in particular to the use of industrial vehicles in communication with electronic badges to control the operation of industrial vehicles and to track pedestrian movement, including the ability to authenticate and track the industrial vehicle operator.

Wireless strategies are deployed by business operations, including distributors, retail stores, manufacturers, etc., to improve the efficiency and accuracy of business operations. Wireless strategies may also be deployed by such business operations to avoid the insidious effects of constantly increasing labor and logistics costs.

For instance, in a typical warehouse implementation, a forklift truck is equipped with a communications device that links a corresponding forklift truck operator to a management system executing on an associated computer enterprise via a wireless transceiver. Essentially, the communications device is used as an interface to the management system to direct the tasks of the forklift truck operator, e.g., by instructing the forklift truck operator where and/or how to pick, pack, put away, move, stage, process or otherwise manipulate items within a facility.

BRIEF SUMMARY

According to aspects of the present disclosure, a system for controlling an industrial vehicle comprises an information linking device, a badge communicator, an operator badge, and a controller. The information linking device wirelessly communicates with a server over a first wireless communication link. The badge communicator communicates with electronic badges that are in short range proximity of the industrial vehicle over a second communication link different from the first communication link. The operator badge is worn by the operator of the industrial vehicle. Moreover, the controller is coupled to memory, such that the controller executes program code stored in the memory to control the operating state of the industrial vehicle based upon the operator badge. More particularly, the controller controls the industrial vehicle operating state by identifying that an operator possessing the operator badge has approached the industrial vehicle to log onto the industrial vehicle, communicating with the server via the information linking device to authenticate the operator as authorized to operate the industrial vehicle, and pairing the operator badge with the industrial vehicle upon determining that the operator is authorized to operate the industrial vehicle. Moreover, the controller controls the industrial vehicle operating state by controlling the industrial vehicle based upon a location of the operator badge relative to the industrial vehicle. Particularly the operating state of the industrial vehicle is controlled by turning on the industrial vehicle when the badge communicator detects the operator badge on the industrial vehicle, placing the industrial vehicle in a standby mode where the badge communicator detects the operator badge in proximity to the industrial vehicle, but not on the industrial vehicle, and placing the industrial vehicle in a stop mode when the badge communicator no longer detects the operator badge in proximity to the industrial vehicle.

BRIEF DESCRIPTION OF THE SEVERAL VIEWS OF THE DRAWINGS

FIG. 6 is an example graphical user interface for programming zone behavior according to aspects of the present disclosure;

FIG. 9 is an example graphical user interface illustrating a simplified database of data collected by a fleet of industrial vehicles operating in an environment to indirectly track electronic badges according to aspects of the present disclosure;

DETAILED DESCRIPTION

According to various aspects of the present disclosure, systems and computer-implemented processes provide communication between electronic badges operating in a constrained environment such as a warehouse and badge communicators on industrial vehicles also operating in the constrained environment. The disclosure herein improves the technologies of industrial vehicles, machine-to-machine communication, and wireless electronic proximity detection. In particular, various aspects of the present disclosure address the technical problem of proximity detection by providing a technical solution that comprises augmenting localized short-range wireless communication with environmental-based location information, industrial vehicle operational information, domain-level information, etc., combinations thereof, as set out in greater detail herein.

The technical solutions herein bring about several technical effects, including automated electronic badge tracking, improved machine-to-machine communication, and improved environmental and situational awareness between industrial vehicles and electronic badges. Moreover, the above technologies are improved by enabling industrial vehicles to work together, collectively and indirectly tracking electronic badges over time where movement of the electronic badges make tracking thereof impractical with other technologies.

The disclosure herein also improves the technologies of industrial vehicles and machine-to-machine communication by fusing together multiple independent sensor/data processing technologies to enable industrial vehicles to dynamically detect, locate, and make decisions based upon the local presence of electronic badges in close proximity to (e.g., within 15-20 meters) an industrial vehicle. In practice, the proximity of the detection range will be dependent on a number of factors, such as the technology used in tracking the badges (UWB (ultra-wide band), Wi-Fi (wireless fidelity), Bluetooth, etc.), power of the transmitter, etc. As such, the range of 15-20 meters is by way of illustration only. Bluetooth is a registered trademark of Bluetooth SIG, Inc., a Delaware corporation, located at 5209 Lake Washington Boulevard, Suite 350, Kirkland, Wash. 98033.

The systems and computer-implemented processes herein dramatically reduce the likelihood of false alarms compared to conventional proximity detection alone, which can identify that a pedestrian is nearby, but cannot contextualize a situation to discern whether to inform a vehicle operator of the pedestrian's nearby presence.

Various systems, processes, hardware configurations, etc., are described herein by way of example and with reference to the FIGURES. In practical applications, any one or more of the various disclosed features, embodiments, processes, capabilities, hardware configurations, etc., can be implemented in any combination or combinations thereof.

Figure 1:
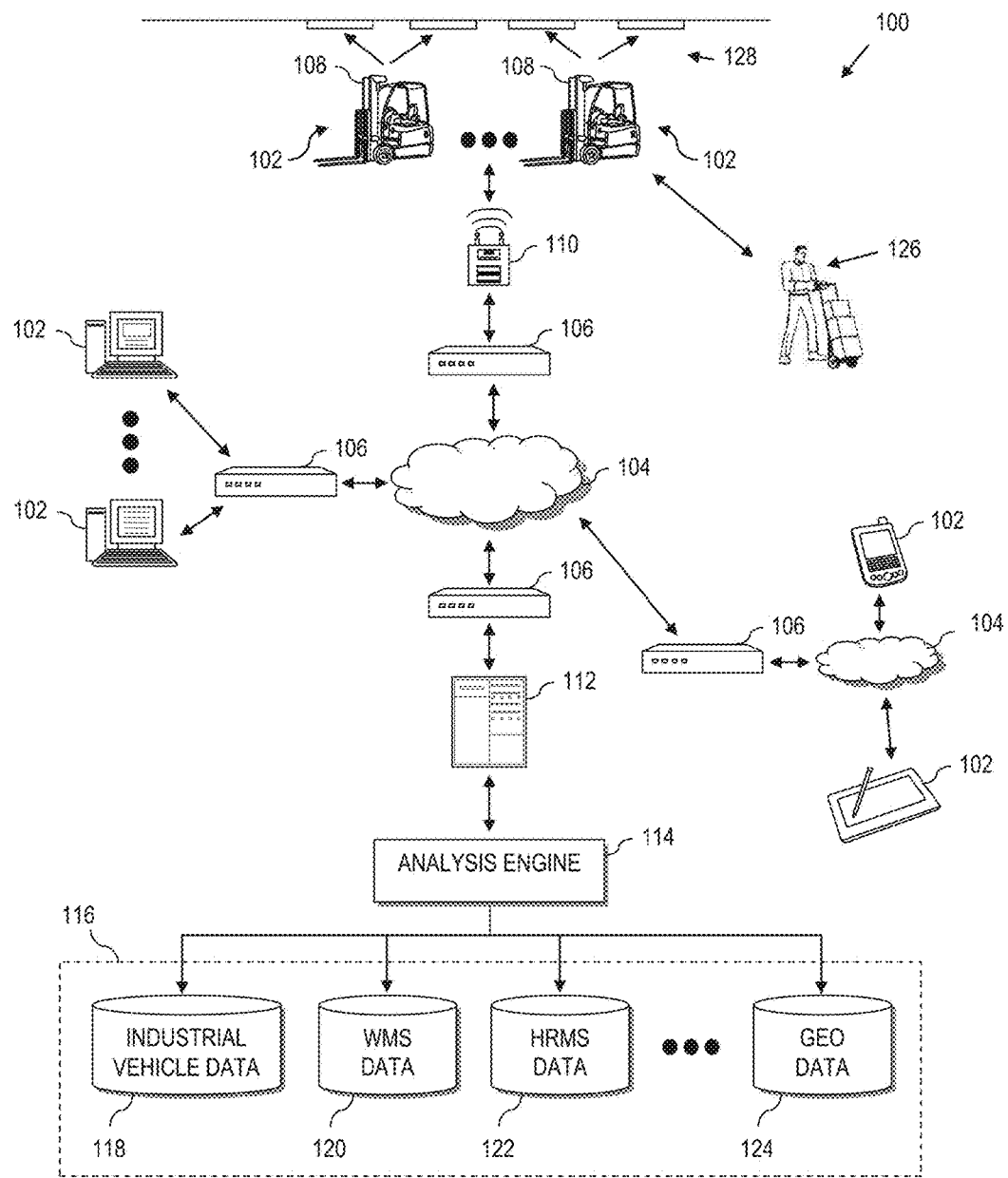
FIG. 1 is a block diagram of a system for operating industrial vehicles, according to aspects of the disclosure.

System Overview:

Referring now to the drawings and in particular to FIG. 1, a general diagram of a system 100 is illustrated according to various aspects of the present disclosure. The illustrated system 100 is a special purpose (particular) computing environment that includes a plurality of hardware processing devices (designated generally by the reference 102) that are linked together by one or more network(s) (designated generally by the reference 104).

The network(s) 104 provides communications links between the various processing devices 102 and may be supported by networking components 106 that interconnect the processing devices 102, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 104 may comprise connections using one or more intranets, extranets, local area networks (LAN), wide area networks (WAN), wireless networks (Wi-Fi), the Internet, including the world wide web, cellular and/or other arrangements for enabling communication between the processing devices 102, in either real time or otherwise (e.g., via time shifting, batch processing, etc.).

A processing device 102 can be implemented as a server, personal computer, laptop computer, netbook computer, purpose-driven appliance, special purpose computing device and/or other device capable of communicating over the network 104. Other types of processing devices 102 include for example, personal data assistant (PDA) processors, palm computers, cellular devices including cellular mobile telephones and smart telephones, tablet computers, an electronic control unit (ECU), a display of the industrial vehicle, etc.

Still further, a processing device 102 is provided on one or more industrial vehicles 108 such as a forklift truck, reach truck, stock picker, automated guided vehicle, turret truck, tow tractor, rider pallet truck, walkie stacker truck, etc. In the example configuration illustrated, the industrial vehicles 108 wirelessly communicate through one or more access points 110 to a corresponding networking component 106, which serves as a connection to the network 104. Alternatively, the industrial vehicles 108 can be equipped with Wi-Fi, cellular or other suitable technology that allows the processing device 102 on the industrial vehicle 108 to communicate directly with a remote device (e.g., over the networks 104).

The illustrative system 100 also includes a processing device implemented as a server 112 (e.g., a web server, file server, and/or other processing device) that supports an analysis engine 114 and corresponding data sources (collectively identified as data sources 116). The analysis engine 114 and data sources 116 provide domain-level resources to the industrial vehicles 108. Moreover, the data sources 116 store data related to activities of the industrial vehicles 108, including captured events, industrial vehicle encounters with electronic badges and geo-features, combinations thereof, etc., as described in greater detail herein.

In an exemplary implementation, the data sources 116 include a collection of databases that store various types of information related to an operation (e.g., a warehouse, distribution center, retail store, manufacturer, etc.). However, these data sources 116 need not be co-located. In the illustrative example, the data sources 116 include databases that tie processes executing for the benefit of the enterprise, from multiple, different domains. In the illustrated example, data sources 116 include an industrial vehicle information database 118 (supporting processes executing in an industrial vehicle operation domain), a warehouse management system (WMS) 120 (supporting processes executing in WMS domain that relate to movement and tracking of goods within the operating environment), a human resources management system (HRMS) 122 (supporting processes executing in an HRMS domain), a geo-feature management system 124 (supporting processes that utilize environmental-based location tracking data of industrial vehicles in a geo-domain), etc. The above list is not exhaustive and is intended to be illustrative only.

Still further, the industrial vehicles 108 include a short range, direct communication with electronic badges 126 that can be remote, but in relatively close proximity (by way of example, 15-20 meters) to a corresponding industrial vehicle 108. Electronic badges 126 can also be positioned on machines, fixtures, equipment, other objects, an industrial vehicle operator, combinations thereof, etc., as will be described in greater detail herein.

In certain illustrative implementations, the industrial vehicles 108 themselves can communicate directly with each other via electronic badge communicator technology, e.g., via a short-range direct communication link, thus forming a mesh network, or temporary mesh network.

One or more of the industrial vehicles 108 can also include an optional environmental-based location tracking device that works with a location tracking system schematically represented by 128, which allows position determination of the industrial vehicle 108, even when operating indoors where a traditional global positioning system (GPS) is ineffective. As will be described in greater detail herein, environmental-based location tracking can be utilized to effectively map and track the location of an industrial vehicle 108 in a dimensionally constrained environment, e.g., a mapped indoor portion of a warehouse.

Figure 2:
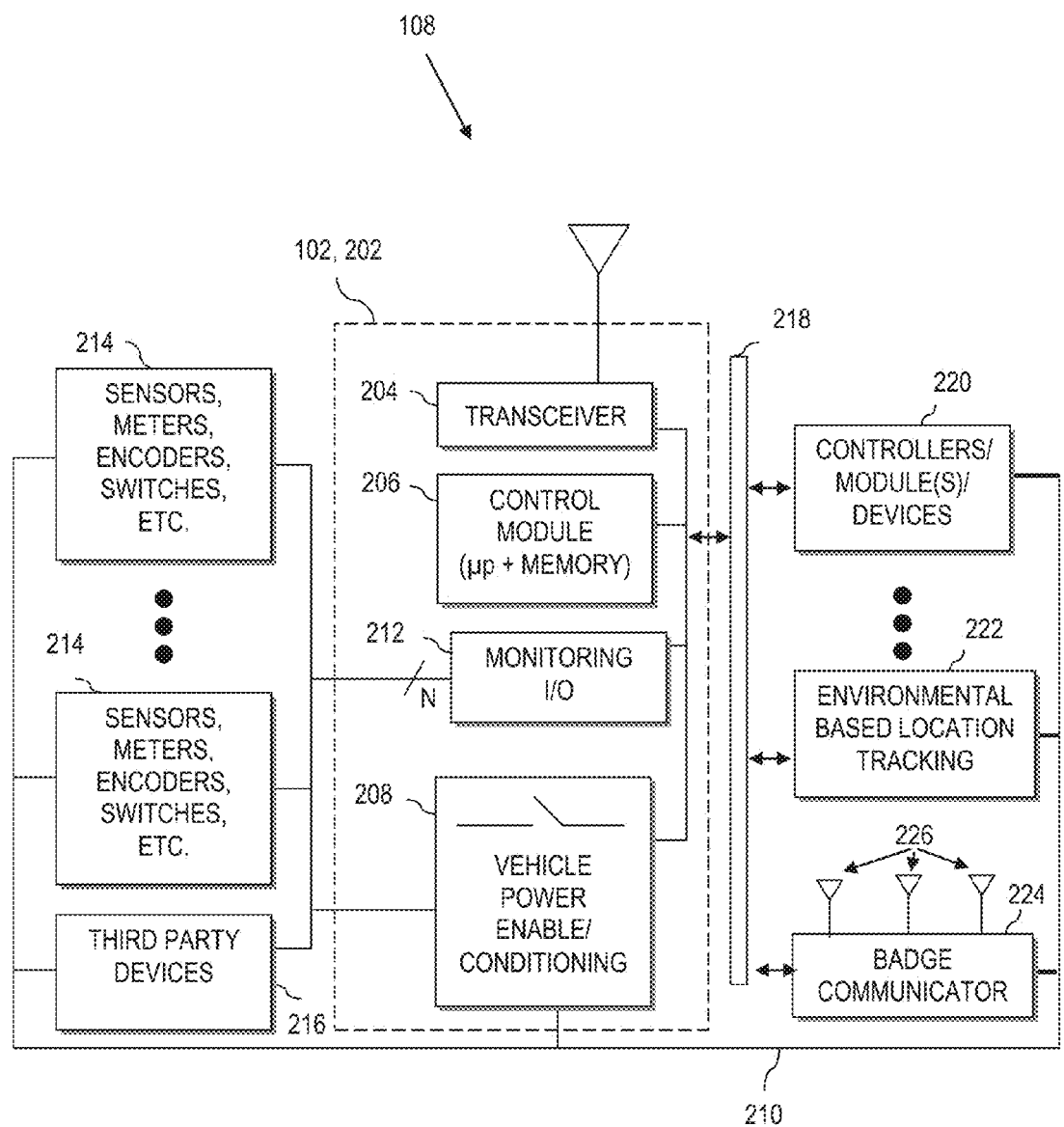
FIG. 2 is a block diagram of a system of electronics on an industrial vehicle such as a forklift truck, which includes an information linking device, an environmental-based location tracking device, and a badge communicator, according to aspects of the present disclosure.

Industrial Vehicle:

Referring to FIG. 2, one or more industrial vehicles 108 include a processing device 102 that is implemented as a special purpose, particular computer, (further designated herein as an information linking device 202) that mounts to or is otherwise integrated with the industrial vehicle 108 (FIG. 1).

The information linking device 202 comprises the necessary circuitry to implement wireless communication, data and information processing, and wired (and optionally wireless) communication to components of the industrial vehicle 108. As a few illustrative examples, the information linking device 202 includes a transceiver 204 for wireless communication. Although a single transceiver 204 is illustrated for convenience, in practice, one or more wireless communication technologies may be provided. For instance, the transceiver 204 communicates with a remote server, e.g., server 112 of FIG. 1, via 802.11.xx across the access points 110 of FIG. 1. The transceiver 204 may also optionally support other wireless communication, such as cellular, Bluetooth, infrared (IR) or any other technology or combination of technologies. For instance, using a cellular to IP bridge the transceiver 204 can use a cellular signal to communicate directly with a remote server, e.g., a manufacturer server across a network 104 (FIG. 1).

The information linking device 202 also comprises a control module 206, having a processor coupled to memory for implementing computer instructions, including computer-implemented processes, or aspects thereof, as set out and described more fully herein. The control module 206 communicates with the components set forth in FIG. 2 described more fully herein making the information linking device 202 a particular machine different from a general-purpose computer. For instance, the control module 206 utilizes the transceiver 204 to exchange information with a remote server 112 (FIG. 1) for controlling operation of the industrial vehicle 108, for remotely storing information extracted from the industrial vehicle 108, etc.

The information linking device 202 further includes power enabling circuitry 208 controlled by the control module 206 to selectively enable or disable the industrial vehicle 108 (or alternatively, to selectively enable or disable specific control modules or vehicle functions such as hydraulic, traction, etc.). For instance, the control module 206 can control the industrial vehicle power enabling circuitry 208 to provide power to the industrial vehicle 108, select components of the industrial vehicle 108, select vehicle functions, etc. via power line 210, e.g., based upon operator login, detected geo-features, etc.

Still further, the information linking device 202 includes a monitoring input output (I/O) module 212 to communicate via wired or wireless connection to peripheral devices attached to or otherwise mounted on the industrial vehicle 108, such as sensors, meters, encoders, switches, etc. (collectively represented by reference numeral 214). The module 212 may also be connected to other devices, e.g., third party devices 216 such as RFID scanners, displays, meters or other devices. This allows the control module 206 to obtain and process information monitored on the industrial vehicle 108.

The information linking device 202 is coupled to and/or communicates with other industrial vehicle system components via a suitable vehicle network bus 218. The vehicle network bus 218 is any wired or wireless network, bus or other communications capability that allows electronic components of the industrial vehicle 108 to communicate with each other. As an example, the vehicle network bus 218 may comprise a controller area network (CAN) bus, Local Interconnect Network (LIN), time-triggered data-bus protocol (TTP) or other suitable communication technology.

As will be described more fully herein, utilization of the vehicle network bus 218 enables seamless integration of the control module 206 and other components of the information linking device 202 into native electronics of the industrial vehicle 108. In the example configuration, the control module 206 of the information linking device 202 connects with, understands and is capable of communication with native vehicle electronic components, such as traction controllers, hydraulic controllers, modules, devices, bus enabled sensors, displays, lights, light bars, sound generating devices, headsets, microphones, haptic devices, etc. (collectively referred to by reference 220).

Environmental-Based Location Tracking

According to yet further aspects of the present disclosure, an environmental-based location tracking device 222 is provided on the industrial vehicle 108. As illustrated, the environmental-based location tracking device 222 is connected to the vehicle electronics via the vehicle network bus 218 (e.g., CAN bus). As a result, the environmental-based location tracking device 222 can communicate directly with the control module 206, as well as other devices linked to the vehicle network bus 218 of the corresponding industrial vehicle 108. The environmental-based location tracking device 222 enables the industrial vehicle 108 to be spatially aware of its location within a dimensionally constrained environment, e.g., a mapped portion of a warehouse.

In the applications described more fully herein, a conventional technology such as a global positioning system (GPS) is not likely to be effective when the industrial vehicle 108 is operated indoors. However, the environmental-based location tracking device 222 can comprise a local awareness system that utilizes markers, including fiducial markers, RFID, beacons, lights, or other external devices to allow spatial awareness within the warehouse environment. Moreover, local awareness can be implemented by machine vision guidance systems, e.g., using one or more cameras. The environmental-based location tracking device 222 may also/alternatively use transponders and triangulation calculations to determine position. Yet further, the environmental-based location tracking device 222 can use combinations of the above and/or other technologies to determine the current (real-time) position of the industrial vehicle 108. As such, the position of the industrial vehicle 108 can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The environmental-based location tracking device 222 can also use knowledge read from inertial sensors, vehicle sensors, encoders, accelerometers, gyroscopes, etc., (e.g., via the controllers 220 across the vehicle network bus 218, via sensors 214 and/or third party devices 216 across the monitoring I/O 212 and vehicle network bus 218, etc.) to determine the position of the industrial vehicle 108 within the warehouse and/or to augment or modify the position determination from the location tracking device 222.

The environmental-based location tracking device 222 is aware of the absolute position of the industrial vehicle 108 within a dimensionally limited environment, e.g., a mapped portion of a warehouse. By "absolute" position, it is meant that the vehicle position is known relative to a map. The map may be a regional area, e.g., only a portion of an indoor facility such as a warehouse. Absolute position is to be differentiated from relative or offset position. A relative offset position can be a general description of an offset distance, e.g., 2 meters away, without also knowing the direction of the offset. Alternatively, the relative offset position can be a general description of a direction without a distance, e.g., towards the power unit of the industrial vehicle 108, without knowing the precise distance. In other examples, the relative offset position can be a precise measure of both offset and direction, 2 meters away in direction X, Y, Z. In this situation, orientation or a standardized reference plane should be established to ensure that offset position is accurately translated to absolute position, and vice-versa. In certain illustrative implementations, the absolute position of the industrial vehicle may be known, but orientation may be unknown. In other implementations, orientation and absolute position are known.

Badge Communicator

The information linking device 202 also communicates with a badge communicator 224. The badge communicator 224 includes a transceiver for short range communication with suitably configured electronic badges (e.g., electronic badge 126 of FIG. 1) in the vicinity of the badge communicator 224, e.g., by way of non-limiting example, in the range of about 15-20 meters or less. The badge communicator 224 can communicate using any proprietary or standardized communication protocol including Bluetooth (over IEEE 802.15.1), ultra-wideband (UWB, over IEEE 802.15.3), ZigBee (over IEEE 802.15.4), Wi-Fi (over IEEE 802.11), WiMax (over IEEE 802.16), etc.

In certain illustrative implementations, the electronic badges are to be worn by pedestrians, workers, industrial vehicle operators, etc. Moreover, electronic badges can be mounted to mobile equipment, industrial vehicles or other moving objects. As such, electronic badges are also referred to herein as mobile badges when used in the context of an electronic badge that is not anticipated to remain stationary. On the other hand, certain electronic badges may be stationary, such as where mounted to the end of an aisle, on racking, above doorways or near breakrooms, or in other situations where the electronic badge is not intended to move. As such, electronic badges are also referred to herein as stationary badges when used in the context of an electronic badge that is anticipated to remain stationary.

In certain illustrative implementations, the badge communicator 224 includes at least three antennae 226. The availability of multiple antennae 226 allows not only signal detection, but also positioning within the detection region. Here, the badge communicator 224 computes position via time of flight calculations, phase calculations, received signal strength calculations, time difference of arrival/lateration and/or other techniques that can be used to determine the direction of the communication with a corresponding electronic badge 126 (FIG. 1). In practice, the antennae 226 can each communicate with the badge communicator 224 across the vehicle network bus 218, thus allowing flexibility in the placement of the antennae on the industrial vehicle 108, which can include placement remote from the badge communicator 224 itself. For instance, each antenna 226 can be mounted on an overhead guard, power unit, work assist bar, structural component, pole, etc. Moreover, each antenna 226 can be mounted on a different location/structure of the industrial vehicle.

As illustrated, the badge communicator 224 is connected to the vehicle electronics via the vehicle network bus 218 (e.g., CAN bus). As a result, the badge communicator 224 can communicate directly with the control module 206, as well as controllers and other modules 220 of the corresponding industrial vehicle 108. Thus, the badge communicator 224 can pass information related to the detection of proximate electronic badges 126 to the control module 206 of the information linking device 202. The control module 206 of the information linking device 202 can then process the received information related to the detection of proximate electronic badges 126, send commands to vehicle controllers and modules 220, take action based upon a known location of the industrial vehicle 108 via information collected from the environmental-based location tracking device 222, pass information back to the badge communicator 224, communicate the collected information to a remote server (e.g., server 112 of FIG. 1), take action based upon information received from the remote server, combinations of thereof, etc.

In yet further configurations, an electronic badge 126 (or equivalent functions thereof) can be added to the industrial vehicle, integrated into the badge communicator 224, etc. This allows the industrial vehicle 108 to broadcast an ID to other badge communicators nearby, and to initiate communications through the local communications capabilities of the badge communicator 224.

Independent Wireless Communication

Figure 3:
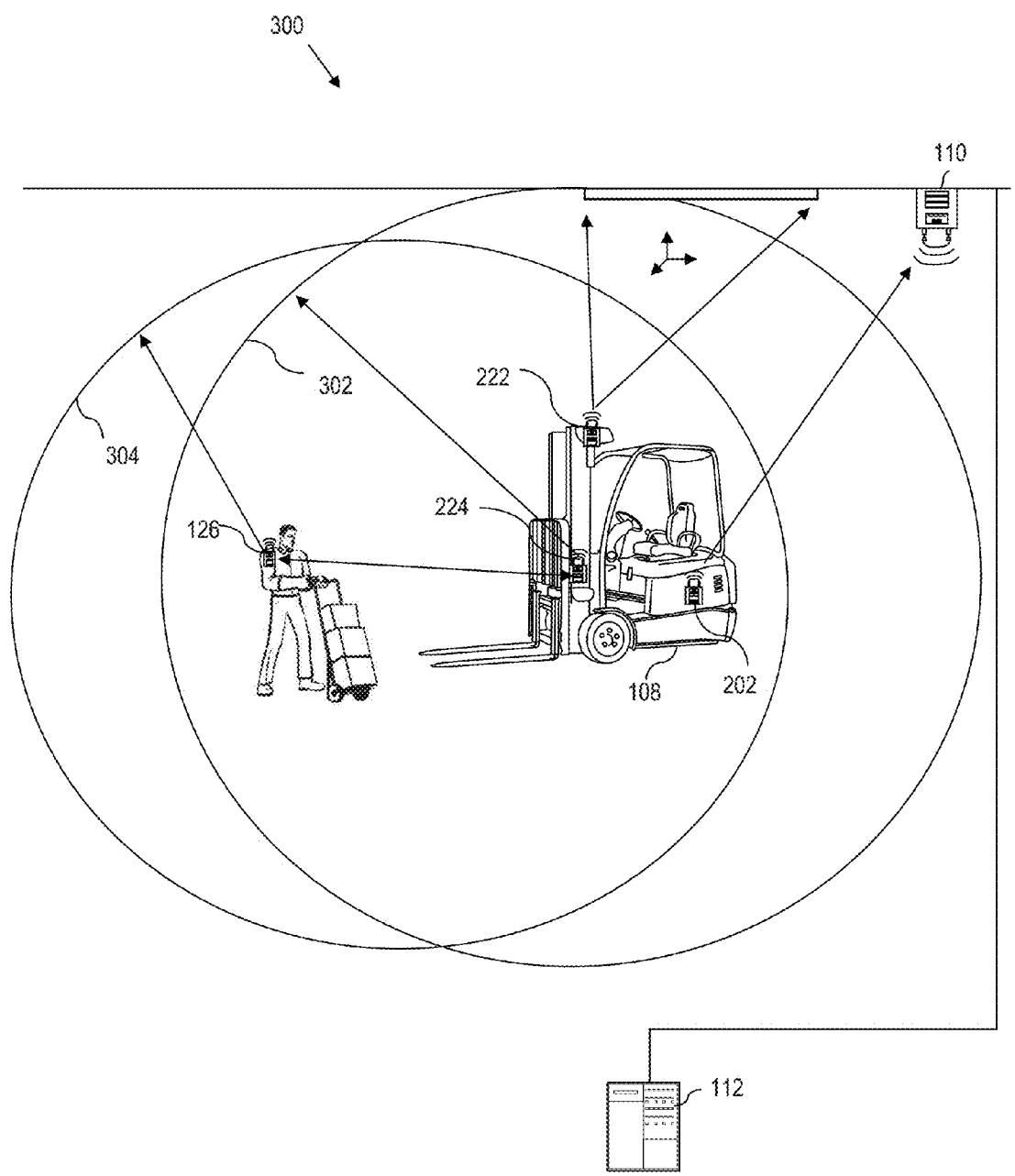
FIG. 3 is a block diagram illustrating various technologies of communication in an environment in which industrial vehicles operate, according to aspects of the present disclosure.

Referring to FIG. 3, an example environment 300 illustrates multiple, independent communications paths and corresponding communication capabilities of an industrial vehicle 108, which provide an enhanced level of information and decision ability. As noted more fully with reference to FIG. 1 and FIG. 2, an industrial vehicle 108 includes a processing device implemented as an information linking device 202, which communicates wirelessly to a server 112 through one or more access points 110 that are spread out across an environment, e.g., a warehouse. This provides a first wireless connection that links the industrial vehicle 108 to an enterprise, which may comprise a fleet of vehicles spread across one or more locations, e.g., operating within a warehouse.

Moreover, where the server 112 is connected to the internet (FIG. 1), the industrial vehicle 108 can access other resources, such as a manufacturer's website. Alternatively, the information linking device 202 can have direct access outside the enterprise via a cellular device, etc. Regardless, this first communications link provides domain level access to information managed by one or more remote servers 112. In other words, through the information linking device 202, the industrial vehicle 108 can be customized and/or become aware of the environment in which the industrial vehicle 108 operates at one or more server-defined domain levels.

As an illustrative example, a manager interacting with a graphical user interface via the server computer 112 can customize parameters via server software, which are wirelessly communicated to the industrial vehicle 108. Such parameters can be used to remotely configure vehicle set points, communicate messages (e.g., commands, control data, operational data, etc.,) or a combination thereof, at a truck domain level. The information linking device 202 (e.g., via the control module 206) reads these parameters and customizes the industrial vehicle via communication across the vehicle network bus (e.g., 218 FIG. 2) to set limitations, restrictions, capabilities, of the industrial vehicle, instruct the operator, etc. Customizations can also be based at the domain level for the enterprise, such as to set parameters based upon the operator logged into the industrial vehicle, policies of the enterprise hosting the domain, etc. Similarly, the wireless network can be used to communicate warehouse management data such as pick instructions, etc., at a WMS domain level, from the server 112 to the industrial vehicle 108.

Independently, the environmental-based location tracking device 222 tracks the location of the industrial vehicle 108 within the warehouse where the industrial vehicle 108 is operated. Here, the environmental-based location tracking device 222 utilizes at least one feature detectable within the defined environment to identify an absolute position of the industrial vehicle 108 over a second wireless communication link, where the absolute position is determined within a bounded and space limited environment—e.g., a mapped portion of a warehouse. Thus, the environmental-based location tracking device 222 has environmental awareness to the extent that the industrial vehicle 108 (or at least the server 112) has a map that identifies its position.

Because the information linking device 202 and the environmental location tracking device 222 communicate over the vehicle network bus 218 (FIG. 2), the location of the industrial vehicle 108 within the warehouse can be passed back to the server 112, e.g., via the transceiver 204.

The badge communicator 224 communicates with electronic badges 126 that are in short range proximity of the industrial vehicle 108 on a third communication link different from the first communication link of the information linking device 202 and the second communication link of the environmental-based location tracking device 222. For instance, as schematically illustrated, the detection range 302 of the badge communicator 224 overlaps the antenna(e) of the mobile badge 126. Likewise, the detection range 304 of the electronic badge 126 overlaps the antenna(e) of the badge communicator 224, thus enabling communication there-between.

In certain implementations, the badge communicator 224 may only be able to detect the presence of a nearby electronic badge 126. In further implementations, a general direction can be discerned, e.g., to the front of the industrial vehicle 108 or to the rear of the industrial vehicle 108. However, where multiple antennae 226 are provided for the badge communicator 224 (see FIG. 2), presence, distance, and direction of a nearby electronic badge 126 are determined. For instance, distance, direction (such as a relative angle) or both are computed by triangulation based upon information received at the multiple antennae 226 (FIG. 2).

In this regard, the term "localized" refers to dynamic communication that is specific to a particular badge communicator 224 on a particular industrial vehicle 108 coming in short range of an electronic badge 126. Although only one electronic badge 126 is illustrated for simplicity of discussion, the badge communicator 224 is capable of communicating with any/all electronic badges 126 that are within suitable range of the badge communicator 224 (optionally up to some reasonable limit).

Notably, in an illustrative implementation, the environmental-based location tracking device 222 is agnostic to the location/proximity of the electronic badge 126 detected by the badge communicator 224. However, the environmental-based location and tracking device 222 can detect the absolute position of the industrial vehicle 108 and is thus aware of static environmental constraints, e.g., via a map that is limited to a pre-mapped section of a warehouse. Here, "static environmental constraints" includes features such as warehouse aisle locations, rack locations, lanes, docks, and other features.

On the other hand, the badge communicator 224 is agnostic to the absolute position of the industrial vehicle 108, e.g., detected by the environmental-based location tracking device 222 within the environment (e.g., warehouse) detected by the environmental-based location tracking device 222, but is aware of the relative position of nearby electronic badge(s) 126.

In an example implementation, where the badge communicator 224 detects an electronic badge 126, the badge communicator 224 communicates the distance and relative angle information (local relative position of the badge) to the control module 206 of the information linking device 202. The control module 206 of the information linking device 202 extracts vehicle operational information, such as from the monitoring I/O module 212, third party devices 214, controllers 220, etc. The information control module 206 of the linking device 202 also extracts the absolute vehicle position from the environmental-based location tracking device 222. The control module 206 of the information linking device 202 can also extract different types of domain level information by interacting with the server 112 via the transceiver 204. In response to the collected information, the control module 206 of the information linking device 202 can cause the industrial vehicle 108 to take appropriate action. In this regard, the control module 206 synthesizes the collected information to carry out enhanced situational awareness responses to the complete environment and circumstances.

For instance, where the information linking device 202 extracts industrial vehicle information such as drive direction (power unit or forks forward), steer angle, load weight, height of forks, speed, vehicle position, a combination thereof, etc., the control module 206 of the information linking device 202 can use rules, e.g., preprogrammed by the server 112, to send the appropriate warnings to the vehicle operator, to control the industrial vehicle 108, to modify performance capabilities of the industrial vehicle 108, etc., in response to detecting nearby electronic badges 126. Thus, by determining actions and reactions, such as by extracting information across the vehicle bus 218, the information linking device 202 can cause electronics on or near the industrial vehicle 108 to provide visual cues, audible warnings, etc., to actively influence vehicle functions and operation.

Data Exchange

Referring to the FIGURES generally, in certain illustrative implementations, when an electronic badge 126 is in the detection range of the badge communicator 224, an exchange of information begins. The exchange can be unidirectional (e.g., from the electronic badge 126 to the badge communicator 224) or bi-directional. In an illustrative example, the electronic badge 126 communicates a badge identification (badge ID) to the badge communicator 224. In addition, the electronic badge 126 can optionally transmit a timestamp and/or a message based upon a critical situation, e.g., battery low, detected damage, etc. The electronic badge 126 can also serve as a personal monitor, measuring and recording the heartrate of the pedestrian, steps taken, serve as a shock counter, etc. Such monitored data can also be communicated to the badge communicator 224.

The badge communicator 224 forwards the collected information to the information linking device 202, which logs the collected information, conveys the collected information to the server 112, or takes other appropriate action. Moreover, the electronic badge 126 can vibrate, flash a light, or provide other indicia to convey information, or to indicate that information has been electronically transmitted.

Zone Ranging

As described herein, "zones" can be described in different contexts. For instance, a "detection zone" defines a physical zone that enables communication between a badge communicator 224 and a corresponding electronic badge 126. Thus, a detection zone is typically determined by the range, strength, and directionality of the transmitter/receiver interaction of a badge communicator 224 and a corresponding electronic badge 126.

An "awareness zone" is a zone, such as an arbitrary, virtual zone that is contained within and can extend up to, but not beyond a corresponding detection zone. Since an awareness zone is virtual, a given awareness zone can take any desired shape only constrained by the corresponding detection zone. According to aspects of the present disclosure, an awareness zone for detecting an electronic badge 126 by the badge communicator 224 in proximity of the industrial vehicle 108 can be dynamically altered based upon predetermined criteria. The modification of at least one awareness zone is referred to herein as zone ranging.

Zone Ranging Based Upon Speed

In an example implementation, the size of the awareness zone dynamically changes based upon vehicle speed. As an example, the information linking device 202 communicates with the vehicle control module 220 (or other appropriate vehicle module, sensor, etc.) via the vehicle network bus 218 to obtain the speed of the industrial vehicle 108. The greater the speed, the greater the size of the zone. The information linking device 202 can also compute speed based upon location tracking. For instance, the information linking device 202 can obtain data points from the environmental-based location tracking device 222 and compute the vehicle speed based upon the known positions of the vehicle, and the time at which each location sample was collected.

In a first example implementation, the transceiver range of the badge communicator 224 is fixed. For instance, the badge communicator 224 may always detect for electronic badges 126 within a 20-meter radius (as an example). Thus, the detection zone is a 20-meter radius in this example. However, the control module 206 of the information linking device 202 sets a virtual range that is arbitrary, but within the badge communicator range. This allows the control module 206 of the information linking device 202 to establish an ad-hoc virtual pattern for an awareness zone limited only by the detection range of the badge communicator 224.

In an example implementation, the information linking device 202 sends a command to the badge communicator 224 to set the size of the detection range based upon the vehicle speed. The badge communicator 224 in this example, can adjust the detection range by controlling power of the badge communicator 224, thus altering the detection zone.

Figure 4:
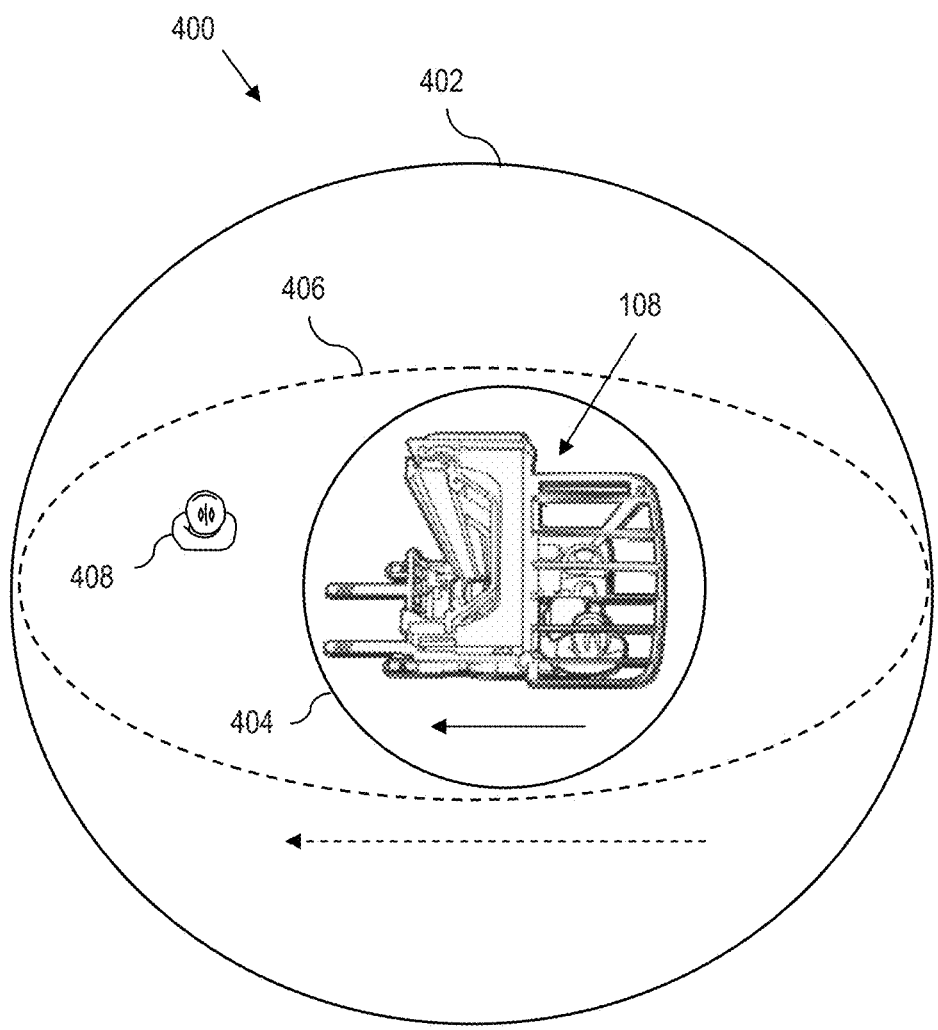
FIG. 4 is a block diagram illustrating the use of dynamic zones for badge communication according to aspects of the present disclosure.

Referring to FIG. 4, in another example implementation, a schematic representation illustrates a detection zone 402, and a virtual zone that can be set to either a first awareness zone 404 or a second awareness zone 406. When the industrial vehicle 108 is below a predetermined speed threshold, e.g., stopped or traveling at a slow speed, e.g., less than a first predetermined speed such as 1 mile per hour (about 1.6 kilometers per hour), the virtual zone may be defined by the first awareness zone 404, which may have a limited range, e.g., a two-meter radius around the industrial vehicle 108. Note in this example that the pedestrian 408 is within the detection zone 402 that sets limits to the detection range of the badge communicator 224. As such, the badge communicator 224 detects the pedestrian 408 (wearing an electronic badge 126 of FIG. 1) and records the encounter with the pedestrian 408. However, pedestrian 408 is judged to be outside the virtual zone (first awareness zone 404). As such, the information linking device 202 may decide to take no action, or the information linking device 202 may initiate feedback to the vehicle operator, e.g., to flash a white or yellow light indication caution.

In the example of FIG. 4, assume now that the speed of the industrial vehicle 108 exceeds the predetermined speed threshold. In this example, the virtual zone can be increased, e.g., to 16 meters (denoted by the second awareness zone 406). In this example, a pedestrian 408 is within the second awareness zone 406. As such, the information linking device 202 takes an appropriate action, e.g., to sound a tone, flash a light, display the detection of the pedestrian 408 on display screen, modify operation of the industrial vehicle 108, or take other appropriate action, examples of which are set out in greater detail herein. The encounter with the pedestrian 408 is likewise recorded.

Although shown with two example awareness zones, in practice, any number of awareness zones can be implemented. Moreover, the awareness zone size and/or shape can continuously change, e.g., based upon speed. Moreover, since the awareness zone is virtual, its shape is not limited to a circular radius. Rather, any arbitrary shape can be defined. In certain implementations, in order for the zone range to be virtual, the badge communicator 224 has to be able to discern not only the proximity of the mobile badge 126, but also the distance of the badge to the badge communicator. Precise direction however, need not be implemented, depending upon the shape of the virtual zone.

Feedback

Due to the nature of the communication between the electronic badges 126 and the badge communicator 224, the detection of an electronic badge 126 can result in the vehicle operator receiving a warning (e.g., visual, audible, tactile, etc.). The electronic badge 126 can also provide feedback, e.g., to the pedestrian carrying the electronic badge 126 via a visual, audible, tactile, etc. feedback. Moreover, the feedbacks need not be the same or occur at the same time. For instance, it may be desirable to warn a pedestrian but not a vehicle operator. Likewise, it may be desirable to warn the vehicle operator, but not the pedestrian, such as where the pedestrian appears to be on a path that leads the pedestrian out of the way of the industrial vehicle 108. This can be helpful to reduce false alarms, thus improving the accountability to the system.

Additional Example Zone Ranging Techniques

Referring to the FIGURES generally, according to aspects of the present disclosure, zone ranging can be implemented based upon criteria other than speed. Moreover, zone ranging can be based upon more than one criteria. By way of example, zone ranging may be based upon drive/travel direction. Certain industrial vehicles 108 can travel in a forks-first or power unit-first direction. The mast or other features of the industrial vehicle 108 may affect the visibility of the vehicle operator such that driving forks-first presents a different range of vision compared to driving power unit-first. As such, travel direction and vehicle orientation may affect zone ranging. For instance, an awareness zone may be larger in forward direction of travel compared to the area behind the industrial vehicle 108. However, if the system detects that the industrial vehicle 108 is traveling forks-first with a mono-mast, the forward awareness zone range in the center of the truck may be increased where a range of vision is possible to be obscured. Likewise, if the mast is off to the side, then the side lobes of the awareness zone may be increased, e.g., within the limits of the associated detection zone.

Correspondingly, if the industrial vehicle 108 is traveling power unit-first and the view is unobstructed, then an awareness zone may be configured according to a first profile in the forward direction, but if the operator is in a side-seat configuration and must rotate his/her head to view the travel direction, then the awareness zone may be configured according to a second, different profile which enlarges the area most in the periphery of the vehicle operator. Thus, drive direction, knowledge of the geometry of the industrial vehicle 108, and knowledge of the vehicle orientation can all be taken into consideration when defining the zone range. Similarly, features such as lift height, steer angle, etc., can be considered. By way of example, the locations and orientations of awareness zones can change based upon the lift height, truck load, or a combination thereof. As an example, the higher and/or heavier the load, the larger the awareness zone.

Zone ranging can be based upon a combination of factors. For instance, by knowing the position (direction and angle) of a detected electronic badge 126 from the badge communicator 224, and by knowing the vehicle speed, steer angle, travel direction, load, and height of the forks from the information linking device 202, a customized awareness zone range can be computed. Thus, for instance, drive direction and steer angle can be linked to a warning zone.

As yet another example, dynamic zones can be created that account for the specifics of a vehicle or vehicle type. For instance, in an example configuration, the range and direction of the awareness zone is dependent upon vehicle speed, driving direction, truck type and steer angle. This allows the information linking device 202, e.g., via information received from the server 112, to take standard vehicle performance, such as acceleration/deceleration curves, turning radius, and known parameters of the vehicle into consideration in defining the size of the awareness zone. For instance, an awareness zone can be biased larger in one direction to account for possible slip, turn radius, deceleration curve, etc. In this regard, the awareness zone is a dynamic zone against the drive direction. This can also take into account pre-programmed operator reaction time, vehicle stopping distance, and other factors, e.g., to set the distance of the zone ahead of the travel direction. Here, stopping distance is likely to also factor in the weight of a load and height of the forks. The parameters can also take into account floor friction accounting for slippage. Thus, the length and width of a zone can vary based upon a dynamically changing and complex set of operating variables and conditions. Moreover, as will be described more fully herein, multiple awareness zones can be simultaneously implemented, e.g., to account for different responses to detection within different awareness zones.

Multiple Zone

Figure 5:
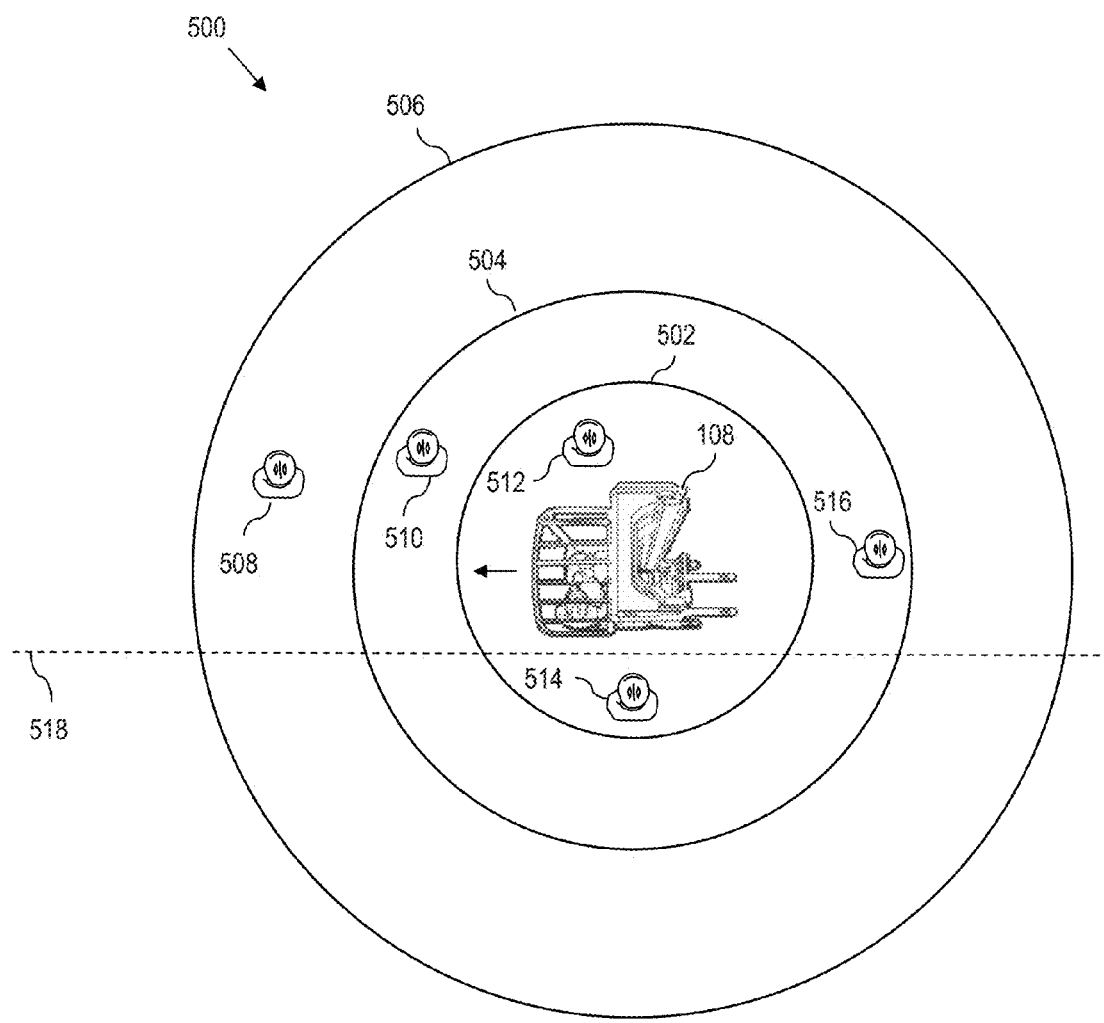
FIG. 5 is a block diagram illustrating several working examples of electronic badge interactions according to aspects of the present disclosure.

Referring to FIG. 5, the badge communicator 224, information linking device 202, and industrial vehicle 108 can cooperate to generate multiple simultaneous zones. This allows, for example, the utilization of a presence zone (aware of the presence of an electronic badge 126, but will not generate a warning), a warning zone (the electronic badge 126 is close enough that the industrial vehicle operator receives a communication) and an action zone (where some control function happens on the industrial vehicle 108—e.g., set points are changed, top speed is limited, etc.).

In the illustrative example environment 500, there are three zones defined about the industrial vehicle 108, including a first (virtual) awareness zone 502 (defining the action zone), a second (virtual) awareness zone 504 (defining the warning zone), and a third (physical) detection zone 506 (defining the presence zone). Moreover, each illustrated pedestrian 508, 510, 512, 514, and 516 is assumed to be wearing or otherwise carrying an electronic badge 126 (FIG. 1). For sake of example, FIG. 5 also illustrates a defined ignore zone border 518. Any detection behind zone border 518 (away from the industrial vehicle 108) will be tracked, but no warnings, communications, vehicle control or other actions will take place.

The pedestrian 508 is detected in the detection zone 506 (within the third zone 506 but outside the second zone 504) so the encounter with the pedestrian 508 is logged but no other specific action is taken.

The pedestrian 510 is in the warning zone 504 (inside the second zone 504, but outside the first zone 502), so the information linking device 202 can, for example, provide an indication to the vehicle operator, e.g., via blinking a light, initiating an audible warning, etc., alerting the vehicle operator of the presence of the pedestrian 510. Also, since the pedestrian 510 is within the detection zone 506, the encounter with the pedestrian 510 is logged.

The pedestrian 512 is in the action zone 502, so the information linking device 202 can, for example, control the industrial vehicle 108 to take action, e.g., by stopping the vehicle 108, initiating a strong warning, e.g., flashing a red light, sounding an alarm, etc. Also, since the pedestrian 512 is within the detection zone 506, the encounter with the pedestrian 512 is logged.

The pedestrian 514 is in the action zone, but is also behind the zone border 518. As such, no control response is taken, although the encounter with the pedestrian 514 is logged.

The pedestrian 516 is in the direct line of path of the forks of the industrial vehicle, and is in the warning zone 504. However, because the industrial vehicle 108 is traveling power unit first (as schematically represented by the arrow), there is no warning given for pedestrian 516 because this pedestrian 516 is not capable of entering the moving path of the industrial vehicle 108. As such, the encounter with the pedestrian 516 is logged, but no specific warning is provided to the vehicle operator.

Notably, the illustrated system dramatically reduces false positive and nuisance alarms by intelligently disqualifying certain pedestrians (e.g., pedestrian 514 and 516 in this example) from triggering an alarm. Moreover, certain pedestrians are far enough away to not elicit an alarm (e.g., pedestrian 508 in this example). As such, only two pedestrians 510 and 512 in this example, cause the industrial vehicle 108 to issue a vehicle operator warning.

As a working example of a top speed reduction application, a vehicle top speed is dynamically altered by the system based upon whether an electronic badge 126 is detected in a particular zone. Here, the system is not automatically controlling the vehicle per se. Rather, the system is changing operating set points or limits. For instance, assume none of the pedestrians 508, 510, 512, 514, 516 are present. If no electronic badge 126 is detected, the top speed is unaltered.

Now, assume that the pedestrian 510 enters zone 2 (the warning zone 504). When an electronic badge 126 enters a warning zone, e.g., zone 2, the vehicle operator is warned, and the top vehicle speed is reduced. This can be a step change based upon zone, or a continuous change. For instance, in an example implementation the maximum allowable speed is based upon the distance from a detected electronic badge 126 to the industrial vehicle 108. The closer the electronic badge 126, the slower the maximum speed. If the vehicle operator always remains below the dynamically changing maximum speed value, the vehicle operator may not notice anything outside the warning.

Assume now, that the pedestrian 512 enters zone 1 (i.e., the action zone 502). If the electronic badge 126 enters an action zone, e.g., zone 1, the industrial vehicle 108 may be reduced to the point of being stopped or maneuvering at a slow speed. Where there is a pedestrian in the action zone 502 and a pedestrian in the warning zone 504, the closest detected pedestrian controls the response of the industrial vehicle 108.

In a first example implementation, the determination of the number of zones, zone size for each zone, and conditions (which can include priority) for each zone are set for a given application. In an alternative example implementation, the determination of the number of zones, zone size for each zone, and conditions for each zone are programmable.

Marker Badge

Electronic badges 126 can also be used to implement geo-based activation or de-activation of vehicle features or capabilities. In a first illustrative example, an electronic badge 126 is converted into a temporary marker badge, e.g., a "talking cone". For instance, by placing the electronic badge 126 on a traffic cone, stand or other article, industrial vehicles 108 can carry out programmed functions when proximate to the marker badge. In a first example, an electronic badge 126 is assigned a unique identification (badge ID) that designates a role as a marker badge as enforcing a speed zone. As such, the top speed of the industrial vehicle 108 is reduced or otherwise regulated when the industrial vehicle 108 is in range of the marker badge. Speed restrictions can be set by modifying a set point so as to limit a top speed regardless of the actual speed of the industrial vehicle 108 upon encountering the marker badge. Thus, the vehicle operator maintains complete control of the industrial vehicle 108, including vehicle speed. However, a maximum speed is temporarily fixed. Thus, if the operator maintains a speed below the fixed limit, the operator may never know that the information linking device 202 temporarily adjusted a set point in the vehicle operating characteristics. In alternative configurations, the information linking device 202 can take control of the industrial vehicle 108 to adjust the speed of the vehicle in response to the badge communicator 224 on the corresponding industrial vehicle 108 detecting the marker badge.

As another example, a marker badge can be attached to an aisle to designate that an aisle is temporarily closed, such as for inventory auditing, cleaning, to designate a hazard area etc. Again, upon detecting the marker badge, the information linking device 202 can warn the vehicle operator not to enter the aisle, or the information linking device 202, can prevent the industrial vehicle 108 from entering the aisle via automated control. This can be implemented by coordination of the environmental-based location tracking device 222 to identify the entrance of the aisle to the control module of the information linking device 202. The control module 206 then interacts with traction and steering controllers 220 of the industrial vehicle 108 to avoid the aisle.

In yet another alternative configuration, certain industrial vehicles 108 may respond in a first manner, e.g., by receiving a warning not to enter the aisle, whereas the marker badge may serve as a beacon to elicit a different response from a different industrial vehicle 108, e.g., an industrial vehicle 108 that is intended to enter the aisle, e.g., to carry out the cleanup in the present example. As such, a certain industrial vehicle 108 can be directed to the correct aisle. In this example, the badge communicator 224 on an industrial vehicle 108 identifies the badge ID as a marker badge that is communicated to the information linking device 202. The information linking device 202 reports the detected marker badge to the server 112. The server 112 is programmed by a set of rules that define the functionality of the marker badge. In this example, the server 112 is programmed to associate a specific industrial vehicle ID and/or operator ID with a marker badge ID as being either permissive or restrictive. The server 112 reports back to the information linking device 202, an appropriate response based upon each ID.

Here, there can be a fixed dependency between the badge ID and a function. Alternatively, an operator interacting with a graphical user interface can program a designated function into an electronic badge 126. The function, and the response thereto may vary based upon operator, vehicle, vehicle type, other factors, combinations thereof, etc. For instance, if a warehouse floor manager becomes aware of a spill, a specific electronic badge 126 can be positioned at the spill site, with a custom program to cause all industrial vehicles to take a pre-programmed action when in proximity to the marker badge.

As yet another example, the electronic badges 126 can be utilized as beacons. For instance, if the absolute position of an electronic badge 126 is fixed, then an industrial vehicle encountering the electronic badge 126 can compute its own position. This can be used to augment the environmental-based location tracking device 222 (extend the location tracking to an area that is currently not mapped, increase reliability of a separate location tracking system, or to increase a known location confidence factor, etc.) or to be used as an environmental-based location tracking device.

Geo-Based Zone Ranging

According to further aspects of the present disclosure, the industrial vehicle 108 includes an environmental-based location tracking device 222 that is in communication with the information linking device 202 via the vehicle network bus 218. As such, the industrial vehicle 108 can implement geo-zone ranging, such that vehicle position/geo-locations can be utilized to define the zone range (or ranges). In this regard, data from the environmental-based location tracking device 222 is merged with data from the badge communicator 224 via the information linking device 202. As such, a parameter affecting the shape of one or more zones can automatically dynamically adjust based upon the industrial vehicle 108 traveling through geo-zones detected by the environmental-based location tracking device 222. By way of example, assume an industrial vehicle 108 drives along an aisle marked as a geo-zone of high pedestrian traffic. In response to detecting the geo-zone, the information linking device 202 automatically adds one meter to the zone dimensions.

Geo-Based Process or Relaying Information

A process of relaying a condition of a limited defined environment to an industrial vehicle 108 (e.g., implementing a talking cone) comprises identifying a condition in a limited defined environment (e.g., spill on the floor, a critical intersection, etc.). The process also comprises associating the identified condition with a badge ID of an electronic badge 126. This can be implemented by creating a mapping table in a memory stored by the server 112 (FIG. 1), programming condition data or codes into a memory of the associated electronic badge, etc. The process further comprises programming an electronic badge based upon the identified condition. This may be implemented simply by assigning a badge ID to the electronic badge, such as where all necessary condition data can be extracted from a server based upon the badge ID. Alternatively, memory in the electronic badge itself can be programmed with special instructions, codes, etc.

Yet further, the process comprises positioning the electronic badge within a work area of industrial vehicles. This may comprise positioning the electronic badge in a predefined, fixed location, such as the end of an aisle, near a break room, on a fixed machine or structure, on a mobile machine such as an industrial vehicle, etc., examples of which are described more fully herein.

The process also comprises receiving, by a processor on an industrial vehicle, information (such as an electronic badge ID) from the electronic badge 126 including at least one of the associated badge ID and the identified condition. For instance, as noted more fully herein, the information can be received on an industrial vehicle 108 via a badge communicator 224 that communicates with electronic badges 126 that are in short range proximity of the industrial vehicle 108 via a first wireless communication link. It would also be possible to receive this information from a badge communicator 224 that is not mounted on an industrial vehicle. This could be a stationary badge communicator 224, for example near a charging station or a door. Still further, the process may send the electronic badge identifier to the server via an information linking device on the industrial vehicle, where the information linking device communicates with the server over a wireless communication link that is different from the wireless communication link between the electronic badge and corresponding badge communicator. The server receives the badge identifier, and responds to the industrial vehicle with the appropriate information.

The process yet further comprises determining the condition from the information from the electronic badge and controlling, by the processor, the industrial vehicle to take a predetermined action based upon the determined condition. For instance, the industrial vehicle can use the badge ID to look up the condition in memory, e.g., at a server, or to look up the condition in memory stored locally on the industrial vehicle, or to look up the condition from memory stored in the electronic badge, etc. As another example, a "condition identifier", e.g., coded value can be stored in the electronic badge itself. Upon initiating communication with the industrial vehicle, the electronic badge communicates a condition code, which can be used as a lookup to identify the condition and appropriate response.

In this regard, the processor may control the industrial vehicle to take a predetermined action based upon the determined condition, by conveying an output to a vehicle operator of the industrial vehicle in response to the condition information received from the electronic badge to redirect a travel path of the industrial vehicle, adjust a travel speed of the industrial vehicle, and adjust a travel direction of the industrial vehicle. As an example, the process may convey an output such as a warning to a vehicle operator of the industrial vehicle 108 in response to the condition information received from the electronic badge 126.

Alternatively, the process may automatically control the industrial vehicle 108 in response to the condition information received from the electronic badge 126. For instance, the processor can control the industrial vehicle to take a predetermined action by automatically controlling the industrial vehicle in response to the condition information received from the electronic badge to alter at least one of travel speed or travel direction.

As noted above, information about the geo-based condition may be conveyed directly by the electronic badge 126, or the electronic badge 126 can provide a badge ID, condition code (also referred to herein as a condition ID), etc., to the badge communicator 224 of an industrial vehicle 108, which is used as a lookup to query the server 112 for the necessary information. In this regard, the badge itself can be agnostic to the absolute position of the placement of the badge.

Notably, the electronic badge 124 can be agnostic to a location of the programmed condition relative to the work area within a limited defined environment, e.g., portion of a warehouse.

In this example, the electronic badge can be used for a number of applications. For instance, the process can determine a location of the industrial vehicle using an environmental based location tracking device that identifies an absolute position of the industrial vehicle within the limited, defined environment over a third wireless communication link. Here, the processor verifies the condition based on the location of the industrial vehicle within the limited defined environment determined by the absolute position of the industrial vehicle determined by the environmental based location tracking device.

Another example application of the process is to identify a condition in a limited, defined environment as a bonded area of the work area. Here, the identified condition is associated with a badge ID by associating a condition as a permission required geo-zone. The electronic badge is staged at a position identifying a boundary of a bonded area in the work environment. Accordingly, the processor of the industrial vehicle can take a predetermined action based upon the determined condition by evaluating that the industrial vehicle has or is about to enter the bonded area, evaluating at least one credential of the vehicle operator to determine whether the vehicle operator has authorization to enter the bonded area, and controlling, by the processor, the industrial vehicle to take an evasive maneuver to avoid the bonded area if the vehicle operator is not judged to be authorized to enter the bonded area.

The process can also identify the condition as a temporary exclude zone. Accordingly, the processor on the industrial vehicle takes a predetermined action based upon the determined condition by extracting a time range associated with the condition, comparing a measure of current time with the time range, and executing instructions to avoid the exclude zone if the current time is within the time range programmed to be associated with the electronic badge.

Server-Side Setup

Referring to FIG. 6, as an example, an operator executing a program on the industrial vehicle application server 112 enters example configuration parameters into a graphical user interface 600. In this example configuration, the user interacting with the graphical user interface 600 can enter the parameters based upon identification of a type of industrial vehicle (e.g., all rider reach trucks are configured with the same parameters), by individual vehicle (e.g., the sit down counter-balance truck XYZ is configured with the entered parameters), by individual (e.g., any vehicle that a vehicle operator with Operator ID 789 logs into will have the parameters), a combination thereof, etc. The server 112 wirelessly communicates the entered parameters to the information linking device 202 of the industrial vehicle 108. The information linking device 202 optionally passes the parameters to the badge communicator 224, depending upon where the processing takes place. In the illustrated example, the user programs a vehicle, a zone 1 range, a zone 1 action, a zone 2 range (in this example, the zone 2 range is dynamic, based upon a preset baseline of 4 meters, plus a dynamic variable determined based upon the speed of the vehicle for sake of illustrating flexibility in the configuration of the zones). The user also programs a zone 2 action, a zone 3 range and a zone 3 action. Other formats, number of zones, static and/or dynamic configurations, etc., could alternatively be implemented.

Indirect Electronic Badge Tracking

As noted above, the communication between a mobile electronic badge 126 and a badge communicator 224 is localized, and thus the electronic badges 126 themselves cannot communicate with an absolute tracking system such as a warehouse (or otherwise indoor) deployed location tracking system (which may rely upon environmental-based location tracking devices 222 having cameras, detectors and processing that is too complex/expensive for individual electronic badges 126).

According to aspects of the present disclosure, encounters of industrial vehicles 108 with electronic badges 126 can be used to indirectly track the location and movement of the electronic badges 126 over time. This is particularly useful to transform the local relative position of electronic badges 126 as detected by badge communicators 224, into a known absolute position, e.g., on a limited or otherwise constrained map, e.g., to track electronic badge 126 movement within a warehouse. As noted in greater detail herein, electronic badges can be worn by persons, or electronic badges can be mounted to vehicles, equipment, etc. As such, a large variety of objects can be indirectly tracked.

Figure 7:
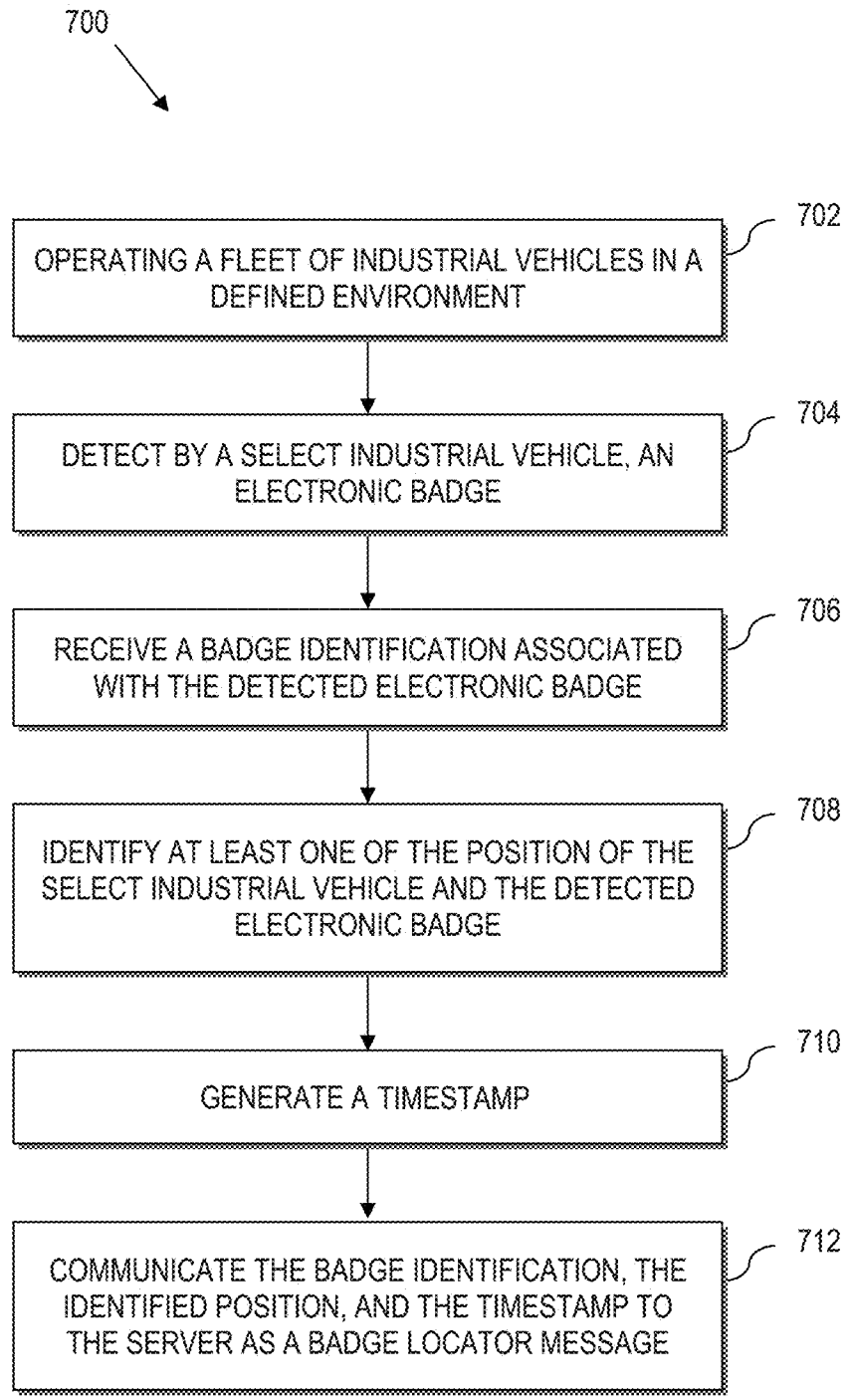
FIG. 7 is a flow chart illustrating a process of indirectly tracking electronic badges from the perspective of an industrial vehicle.

Referring to FIG. 7, a computer-implemented process is provided of indirectly tracking electronic badges. In this regard, the computer-implemented process 700 can be implemented by a processor coupled to memory that stores instructions that when read out and executed by the processor, implements relevant aspects of the computer-implemented process 700. For instance, the process 700 can be implemented by cooperation of the information linking device 202, the environmental-based location tracking device 222, and the badge communicator 224 (FIG. 2) on an industrial vehicle 108 moving about a pre-mapped region, e.g., a mapped portion of an indoor warehouse.

The computer-implemented process 700 of indirectly tracking badges can be carried out by a fleet of industrial vehicles 702 operating in a defined environment. As noted more fully herein, each such industrial vehicle has an information linking device that wirelessly communicates with a server over a first wireless communication link, an environmental-based location tracking device that utilizes at least one feature detectable within the defined environment to identify an absolute position of the industrial vehicle over a second wireless communication link, and a badge communicator that communicates with electronic badges 126 that are in short range proximity of the industrial vehicle on a third communication link different from the first communication link and the second communication link. The process 700 comprises detecting at 704, by a select industrial vehicle in the fleet of industrial vehicles, a badge, e.g., within range of the corresponding badge communicator.

The computer-implemented process 700 also comprises performing a badge logging transaction in response to detecting the badge. The badge logging transaction is performed by receiving, at 706, by the badge communicator, a badge identification associated with the detected electronic badge. For instance, the badge communicator can communicate with a transponder of the electronic badge by communicating across the third communication link, e.g., using a UWB radio.

The computer-implemented process 700 also comprises identifying, at 708, at least one of: the position of the select industrial vehicle and the detected badge. More particularly, in an example configuration, the identification at 708 comprises determining, by the badge communicator, an offset measurement of the electronic badge relative to the select industrial vehicle. Thus, the information linking device 202 sends to the server 112, the industrial vehicle position and the electronic badge offset. The server can then compute the absolute position of the electronic badge 126 by electronically determining a vehicle location of the select industrial vehicle, and identifying a badge location based upon the determined vehicle location and the measured offset.

In another example configuration, the information linking device 202 can send the server 112, the absolute position of the detected electronic badge. As an example, the computer-implemented process 700 implements the identification at 708 by obtaining, by an environmental-based location tracking device 222 (FIG. 2) on the select industrial vehicle 108, the absolute location of the industrial vehicle 108 within a limited, defined environment. As noted above, the badge communicator 224 (FIG. 2) generates an offset measurement of the electronic badge 126 relative to the industrial vehicle 108. A badge location is then identified by computing an absolute location of the electronic badge based upon the absolute location of the select industrial vehicle and the offset measurement. For instance, the absolute location of the electronic badge may be determined by identifying the electronic badge location as the absolute location of the industrial vehicle, as modified by a distance offset and an angle offset of the electronic badge relative to the industrial vehicle.

The computer-implemented process 700 further comprises generating, at 710, a time stamp, and wirelessly communicating, at 712, at least the badge identification, the badge location, and the timestamp (e.g., as a badge locator message) to the server (e.g., server 112 (FIG. 1)).

Thus, the computer-implemented process 700 effectively maps relative positions detected by the badge communicator, to absolute positions on a map associated with the environmental-based location tracking system. As such, electronic badges 126 can be tracked on the map of the environmental-based location tracking system.

Figure 8:
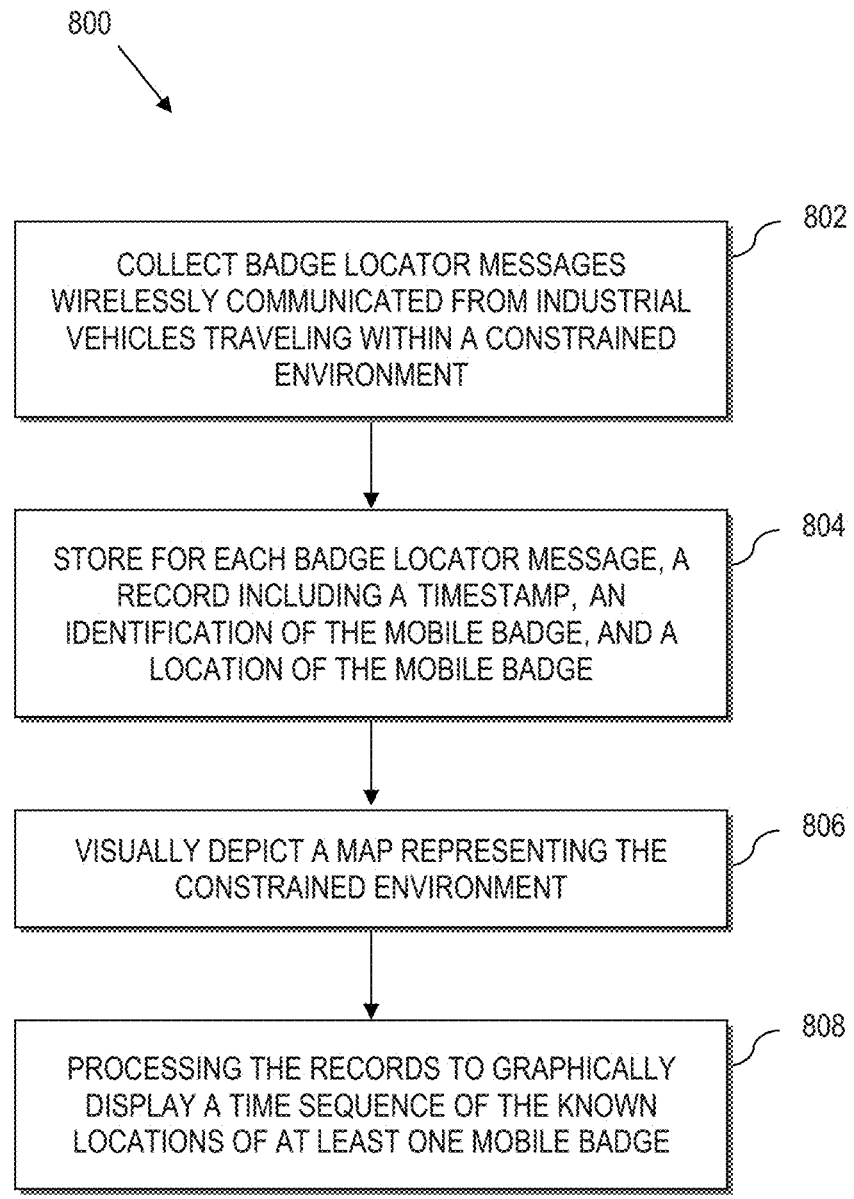
FIG. 8 is a flow chart illustrating a process of indirectly tracking electronic badges from the perspective of a server computer.

Referring to FIG. 8, a computer-implemented process 800 is illustrated for creating an indirect path of a select badge identifier on a map. The process 800 can be implemented by a processor coupled to memory that stores instructions that when read out and executed by the processor, implements relevant aspects of the process 800.

At the server computer, e.g., server 112, the server processor performs the computer-implemented process 800 comprising collecting, at 802, badge locator messages wirelessly communicated from industrial vehicles traveling within a constrained environment. Here, each badge locator message indicates that an industrial vehicle encountered an electronic badge. The process comprises storing, at 804, for each badge locator message, a record comprising a time stamp, an identification of the encountered electronic badge, and a location of the electronic badge. The process still further comprises interacting with a graphical user interface, at 806, to visually depict a map representing the constrained environment, and processing, at 808, the badge locator messages to graphically display a time sequence of the known locations of at least one electronic badge 126 (e.g., as identified by the associated badge identifier). For instance, the graphical display can order the badge locator messages associated with a given electronic badge 126 chronologically.

Mapping can be carried out for instance, in response to a user such as a warehouse manager interacting with a graphical user interface, e.g., by selecting a particular badge identifier, such as from a menu, drop down box, data entry box, etc. The user can also select a time window or other desired filtering characteristics. For instance, a user such as a manager may want to track a badge identifier associated with an electronic badge 126 over the course of a predetermined time window, e.g., over the course of a shift, a few hours, or some other time limited set of values.

The mapping is further carried out by extracting from the badge locator messages, instances of the select badge identifier, extracting from each extracted message, the badge location, and transforming the badge location of each extracted badge locator message, to a mapped position of the select badge identifier on a map. The mapping approach further comprises displaying, via a graphical user interface, the map and indicia corresponding to the mapped position of the select badge identifier, e.g., by representing the badge as an icon tracing movement of the badge based upon the discrete "sightings" of the badge as industrial vehicles move about a warehouse.

The computer-implemented process may further comprise computing, based upon two sequential known positions, a predicted travel path of the electronic badge, and displaying on the graphical user interface, the predicted movement of the electronic badge.

Referring briefly to FIG. 9, a graphical user interface 900 illustrates a portion of a database having a plurality of records, each record storing information wirelessly received from industrial vehicle messages identifying the location of a detected electronic badge 126. The illustrated simplified example includes for each record, a badge ID, location where the badge ID was detected, a timestamp, an identification of the vehicle that detected the electronic badge 126, and additional information.

For instance, in an example implementation, an environmental-based location tracking device on a select industrial vehicle identifies the absolute location of the industrial vehicle within a limited, defined environment, e.g., within a map supported by the environmental-based location tracking system. The select industrial vehicle wirelessly communicates a message to a remote server the vehicle location, and a vehicle identification as part of the message. For instance, as noted in row 1 of the example data illustrated in FIG. 9, vehicle RR-234 identified badge 123 at the top of aisle 5 at 9:00 AM. At the time, RR-234 was working on pick order 3. The location "Top of Aisle 5" is presented solely for simplified clarity of illustration. In practice, the locations could be expressed in more defined terms, such as latitude and longitude, X, Y, and Z coordinates, or any other coordinates. In this regard, the location of the badge can be expressed in absolute terms, e.g., coordinates on the map. In another example, the location of the badge can be communicated to the server as the location of the industrial vehicle and a measured offset such as a distance offset and an angle offset, e.g., coordinates X, Y shifted by Z meters in a direction of A degrees relative to a fixed coordinate system. The measured offset can also be expressed as a vector, etc.

Figure 10:
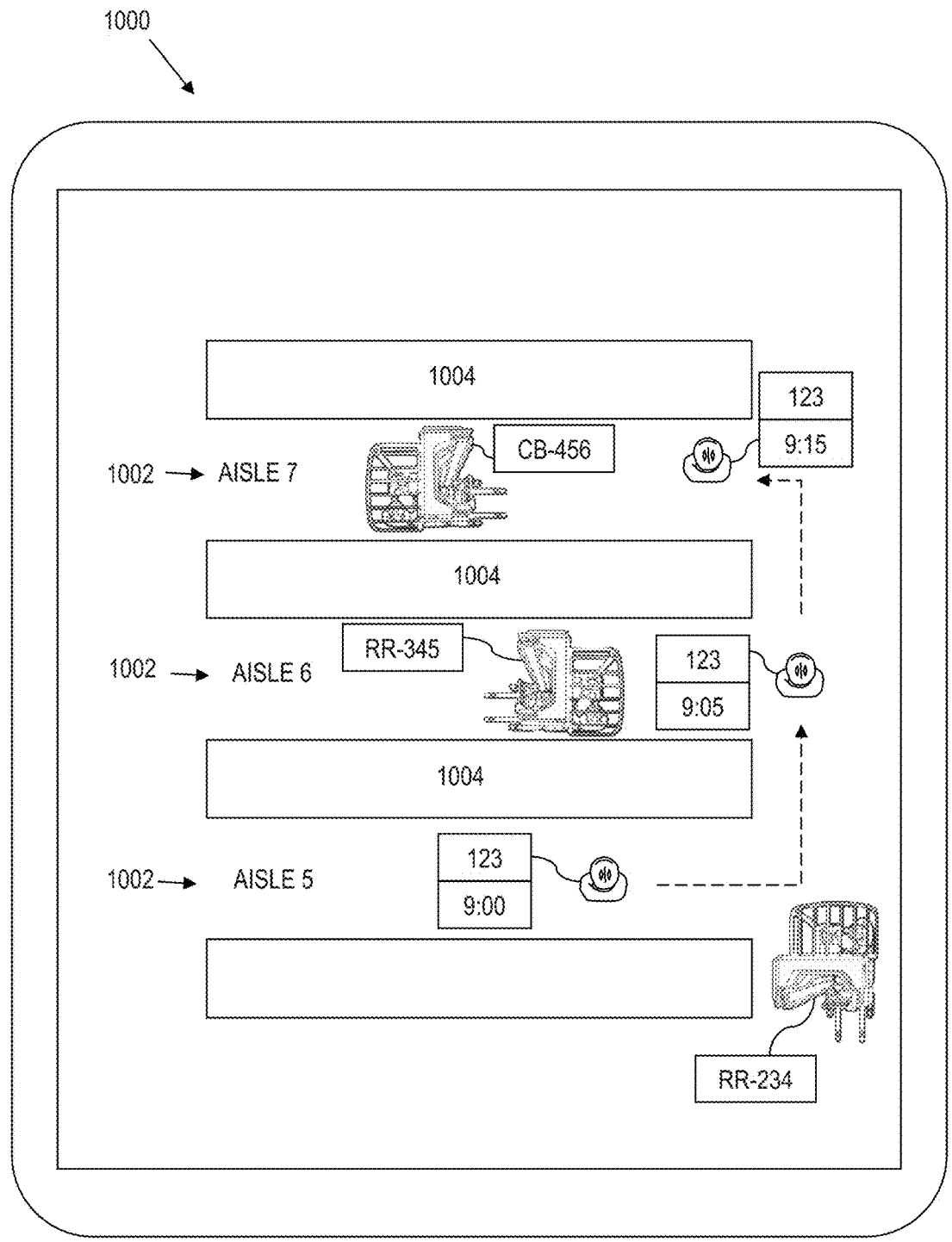
FIG. 10 is an example graphical user interface illustrating a movement map of a selected electronic badge collected in the database of FIG. 9.

Referring to FIG. 10, a graphical user interface 1000 illustrates a partial map illustrating the movement of an exemplary electronic badge 126, which has been assigned a unique ID number of 123 through a portion of a warehouse based upon the records in the table of FIG. 9.

For instance, the server 112 can load a map of a defined environment, where the map has features that characterize the physical layout of the defined environment. As an example, loading a map of a defined environment can be implemented by loading a map that has defined aisles that indicate where an electronic badge 126 is allowed to navigate, and restricted areas where the electronic badge 126 cannot navigate through, so that a predicted path must satisfy constraints of the map and a corresponding loaded profile.

By way of illustration, in the example of FIG. 10, the map shows aisles 1002 (aisles 5, 6, and 7 in the simplified example—which represent for instance, areas that indicate where the electronic badge 126 is allowed to navigate) along with restricted areas 1004, such as the long rectangles representing racking, work stations, etc. (where the electronic badge 126 cannot navigate through). The server interacts with the graphical user interface to load a profile that identifies movement characteristics of the user-selected electronic badge. For instance, the data of FIG. 9 shows that badge 123 was in Aisle 5 at 9:00, the top of Aisle 6 at 9:05, and Aisle 7 at 9:15. The server computes predicted paths between adjacent chronological time stamps based upon the loaded profile, the map, and the features of the defined environment. For instance, the electronic badge having badge ID 123 is worn by a person who cannot walk through the restricted area 1004. Moreover, the system knows the rate of travel possible by the person associated with the electronic badge having badge ID 123, and time between adjacent sightings. As such, the server 112 predicts the most likely travel path of the person. Thus, the server 112 executes rules, constraints, etc., that limit how the server will attempt to define the travel path of the electronic badge having badge ID 123. The server 112 can also compute animations, animated video and other visual approaches to illustrate the collected data, e.g., by using information in the database records shown in FIG. 9 to query any of the data sources 116 of FIG. 1.

In this manner, the graphical user interface displays the map and indicia corresponding to the mapped position of the select badge identifier, and can display the indicia corresponding to the mapped position of the select badge identifier over a predetermined time window to show movement of the select badge identifier. Moreover, the graphical user interface can display a visual indicator of the select badge identifier at multiple positions on the map, and at each position, identify an associated time stamp or other relevant data, e.g., the industrial vehicle that identified the electronic badge, the task that the industrial vehicle was performing, etc.

Also, note that in FIG. 10, each recorded position of the electronic badge includes a pop up of metadata showing the timestamp. The data can also show the industrial vehicle that identified the displayed electronic badge, as well as other recorded information, e.g., extracted from the warehouse management system, labor management system, vehicle information, etc.

Although FIG. 10 shows a single electronic badge, in practice the user interface allows the user to select one or more electronic badges, including a range of electronic badges for simultaneous display. Accordingly, the graphical user interface can be configured for displaying a visual representation of a mapped portion of a defined environment, and predicted movement of multiple electronic badges overlaid onto the map.

Notably, the graphical user interface can use a set of rules and knowledge of the map to predict a likely path taken by the electronic badge 126. For instance, if the electronic badge 126 is worn by a pedestrian, the pedestrian cannot walk through racking. Rather, the pedestrian is more likely to have walked down an aisle. Also, knowing average travel speeds, capabilities of the electronic badge 126, tasks assigned to the pedestrian (or vehicle operator or other worker) wearing the electronic badge 126 etc., the quality of the predicted path can be refined. Yet further, the ability to calculate the absolute position of a pedestrian enables the system to calculate not only the pose, but the velocity, heading, and acceleration of the pedestrian from knowing the absolute position in real-time. Thus, path estimation and path forecasting can be implemented. Moreover, the pedestrian location information can be reconciled with other data sources, e.g., a WMS, LMS, ERP or other system to validate that the pedestrian presence is warranted in the identified locations.

In an illustrative working example, the map of FIG. 10 can be used to generate a heat map of pedestrian locations/traffic patterns. This can lead to industrial vehicle traffic/travel optimizations that dynamically assign new routes based upon current conditions.

Electronic Badge Accounting

In an example implementation, the server can identify a predetermined event, compare a master list of all electronic badges with the collected badge locator messages, identify the most recent identified position of each electronic badge, and generate a report of each electronic badge that is not accounted for in the collected badge locator messages. In a working example of this, in the case of an emergency such as a fire, industrial vehicles can be staged by the exits. There could also be stationary badge communicators mounted in stationary places of the facility such as exits and meeting points. Thus, mobile electronic badges 126 can be counted automatically at the meeting point. As pedestrians wearing an electronic badge 126 pass a corresponding industrial vehicle 108 to exit the facility, the system will detect the electronic badge 126. By comparing detected electronic badges 126 to a master inventory, a determination can be made as to whether anyone is left inside the building.

As another example, a badge communicator 224 can be placed at a designated place, such as where a designated meeting place is defined in case of emergencies. If an electronic badge 126 is not accounted for, industrial vehicles traveling or otherwise staged throughout the warehouse can identify missing electronic badges 126. Moreover, one or more designated industrial vehicles can actually be sent out to travel through a facility to locate an individual without having to actually see the individual. In certain implementations, this can be used to communicate information back to the electronic badge 126, e.g., to designate a preferred exit to use, etc. Where badge communicators are placed within the detection range of each other, the badge communicators can be used to form temporary mesh networks to exchange information and to pass information back to the server 112.

Communication with an Electronic Badge

Referring to the FIGURES generally, in yet a further illustrative example, the system can use indirect tracking of electronic badges as a means to trigger workflows and communications with electronic badges or a worker associated with an electronic badge. In this example configuration, a manager interacts with a graphical user interface of a computing device to pre-define a set of rules that affect when the system communicates to a worker. The rules may be based upon static information, dynamic information, geo-based information, domain-level information, etc. Moreover, one or more rules can be associated with either an electronic badge identification, or a worker identification. The rules can be unique per electronic badge/user, and/or one or more rules can be applied across all electronic badges/workers, subsets thereof, etc.

A few example rules can include a rule restricting a worker from a bonded area of a warehouse (geo-fence), and a rule prohibiting pedestrians from walking in a designated travel path that is reserved for industrial vehicles. As yet another example a rule can indicate that no more than two pedestrians can be in the same picking lane. In another example, using domain-level information, such as information extracted from a WMS system, a rule can indicate that an operator of an industrial vehicle, who wears an electronic badge, should only step off a corresponding industrial vehicle at designated pick locations. Similarly, a pedestrian detected near a bin can be tied back to a WMS system to verify that the worker is in the correct location, even where the industrial vehicle that detects the pedestrian is not assigned to the pick operation.

As a working example, assume that an industrial vehicle passing by a restricted area detects a pedestrian in a restricted area. The industrial vehicle can send the absolute position of the pedestrian to the server, which sends an alert message either to the industrial vehicle to be forwarded to the electronic badge 126, or the server can send a message directly to the badge. Alternatively, since the industrial vehicle may have a local map that defines the restricted area, a processor on the industrial vehicle may compare a computed location of the electronic badge 126, and compare that information to a map such that the industrial vehicle itself recognizes that the pedestrian is standing in a restricted area (by way of the onboard map and GEO zones), and send the alert message directly to the pedestrian.

In another example, a pedestrian wearing an electronic badge 126 is at an intersection and is supposed to stop first. A proximate industrial vehicle 108 detects the pose and path of the pedestrian, and sends a warning if the pedestrian didn't stop.

The graphical user interface can also serve as a message conveyance system. In this example configuration, a manager posts a message to a specific pedestrian, which gets relayed to the pedestrian through the nearest industrial vehicle.

Vehicle Badge

Electronic badges 126 are not limited to use for pedestrians or fixed temporary locations. Industrial vehicles 108 themselves can be equipped with an electronic badge 126. Yet further, the vehicle operator can also wear an electronic badge 126. This allows unique opportunities for customized vehicle-to-vehicle encounters in the course of operation. For instance, where two industrial vehicles come in close proximity of one another, e.g., 20 meters or less, each industrial vehicle can use its electronic badge, vehicle operator electronic badge and corresponding badge communicator 224 as a bridge or link to establish direct, vehicle to vehicle communication. As such, industrial vehicles 108 can pass data sets, instructions, and other information.

The ability to equip both the industrial vehicle and/or the vehicle operator with a unique electronic badge 126 provides the ability to form mesh networks, e.g., to make both the industrial vehicle and vehicle operator known to other close-by industrial vehicles. This is particularly useful in areas where there is no connectivity to the server 112. For instance, industrial vehicles can manage themselves for actions such as industrial vehicle collision warning, passing/overtaking control, and other forms of traffic management independent of server interaction. For instance, each industrial vehicle 108 can be programmed with a set of traffic management rules. A rule can address overtaking, passing a stopped industrial vehicle, collision avoidance rules, etc. For instance, when two industrial vehicles are in close proximity to each other, each industrial vehicle can identify the other based upon the vehicle badge independent of the server 112. Moreover, each industrial vehicle can detect the ID of the other vehicle operator, and determine whether the vehicle operator is on, or off the industrial vehicle, e.g., in the racks performing a pick operation.

Advanced Working Examples

To better illustrate some of the features described more fully herein, working examples are presented by way of illustration, and not by way of limitation.

Zone Ranging Based Upon Steer Angle—Optional Look Ahead

Figure 11:
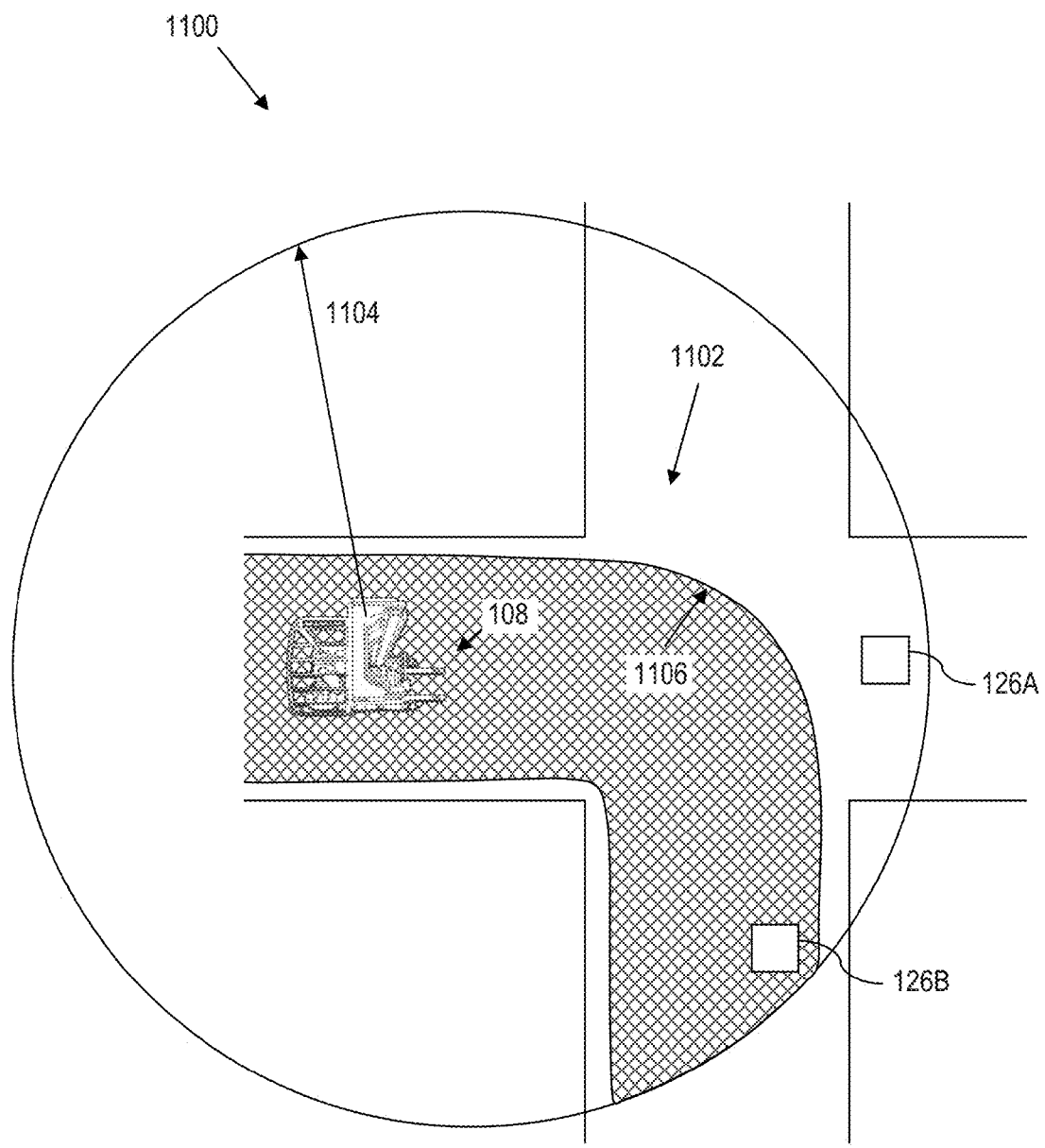
FIG. 11 is a schematic representation of an example customized awareness zone based upon an expected travel path of an industrial vehicle.

Referring to FIG. 11, as noted more fully herein, the information linking device 202 is capable of creating virtual zones that can dynamically change based upon vehicle operating parameters and other information known to the information linking device 202, e.g., information received from the server 112. In this working example, zone ranging decisions can be based on drive direction and steer angle. The zone can also be based upon vehicle speed. In this working example, there are two electronic badges 126A and 126B in an intersection 1102. Both electronic badges 126A and 126B are in the detection range of the badge communicator 224 on the industrial vehicle 108 as denoted by the detection zone 1104. However, the information linking device 202 knows that the vehicle steer angle is changing, and thus the information linking device 202 creates a virtual zone, i.e., an awareness zone 1106 that follows the steer angle. In this regard, electronic badge 126B is in the travel path of the industrial vehicle 108 but electronic badge 126A is not. As such, the vehicle operator is warned about electronic badge 126B. Moreover, electronic badge 126A is not warned (or receives a "caution" warning), even though at the instant illustrated, it appears as if electronic badge 126A is in the direct line of the industrial vehicle 108. However, the badge communicator 224 may communicate a warning to the electronic badge 126B.

In a second working example, the information linking device 202 on the industrial vehicle 108 can receive information from the server 112 that the industrial vehicle 108 needs to turn right at the intersection 1102 in order to arrive at the next task destination based upon information extracted from the warehouse management database 120. The information linking device 202 also receives information from the environmental-based location tracking device 222 that the industrial vehicle 108 has entered the intersection 1102 and must turn right. As such, the information linking device 202 may dynamically adjust the awareness zone 1106 even before the steer angle of the vehicle is adjusted, thus implementing a look-ahead function. If the steer angle of the industrial vehicle is not changed, e.g., the vehicle operation strays from the intended travel path, the information linking device 202 detects the deviation, and re-directs the awareness zone 1106 based upon the steer angle, travel direction, and optionally, speed.

In an alternative example implementation, the server acts as a central controller. Based on pose estimations of where pedestrians are, the server sends a direct warning to a pedestrian (using Wi-Fi on the badge if so enabled) that an industrial vehicle 108 will be proximate the pedestrian, e.g., entering an aisle in 1 minute, even though the industrial vehicle 108 is not in the aisle yet.

Notably, in the above examples, a vehicle operator is warned of a pedestrian (via a corresponding electronic badge 126) even where the vehicle operator has no direct line of sight to the electronic badge 126. This ability to perform advanced detection allows traffic optimization, traffic flow control, etc. For instance, the vehicle operator can be instructed to "keep right" when making the turn. Likewise, the pedestrian carrying the electronic badge 126 can be instructed to move to a pedestrian walkway adjacent to the aisle.

Vehicle Generated Pedestrian Feedback

In yet another illustrative example, the industrial vehicle can provide feedback to the pedestrian/electronic badge 126 in addition to/or in lieu of feedback to the vehicle operator. For instance, horns, lights, combinations thereof, etc., can be mounted in different orientations, e.g., arrayed around the industrial vehicle 108. For instance, in an example implementation, a horn, light, combination thereof, etc. can be provided in each corner of the industrial vehicle 108. When the badge communicator 224 detects an electronic badge 126 within range of the industrial vehicle 108, only the feedback most closely directed to the electronic badge 126 is given. Thus, if an electronic badge 126 is forward and to the right of the power unit of an industrial vehicle 108, and the industrial vehicle 108 is traveling power unit forward, then only the light, horn, etc., in the right-hand corner of the operator compartment of the industrial vehicle 108 is activated to warn the electronic badge 126.

The horns/lights, etc. behind and to the left of the operator compartment are not activated. This allows independent indicia to provide selective warnings and/or to narrow the field/direction of the warnings. Moreover, the intensity of the warning can modulate/change over time. For instance, the volume of an audible message can change based upon how close the electronic badge 126 is to the industrial vehicle 108. In an example implementation, the audible message volume reduces the closer the electronic badge 126 is to the industrial vehicle 108. In another example, the intensity of light, color of light, rate of flash, etc., can be varied dynamically based upon the distance and direction of the electronic badge 126 to the industrial vehicle 108, industrial vehicle travel path, combination thereof, etc. In yet a further example implementation, the electronic badge 126 alert (light, horn, etc.) can be directed towards the electronic badge 126. In an example implementation, the information linking device 202 controls a horn to rotate according to the angle of the detected pedestrian to initiate the message. This can be accomplished by mounting the horn for instance, on a rotary stage. It would also be possible to mount several directional horns, each having its own warning-section and each controlled separately. This would provide a warning direction realized by selective controls of several directive horns.

Geo-Marker

Figure 12:
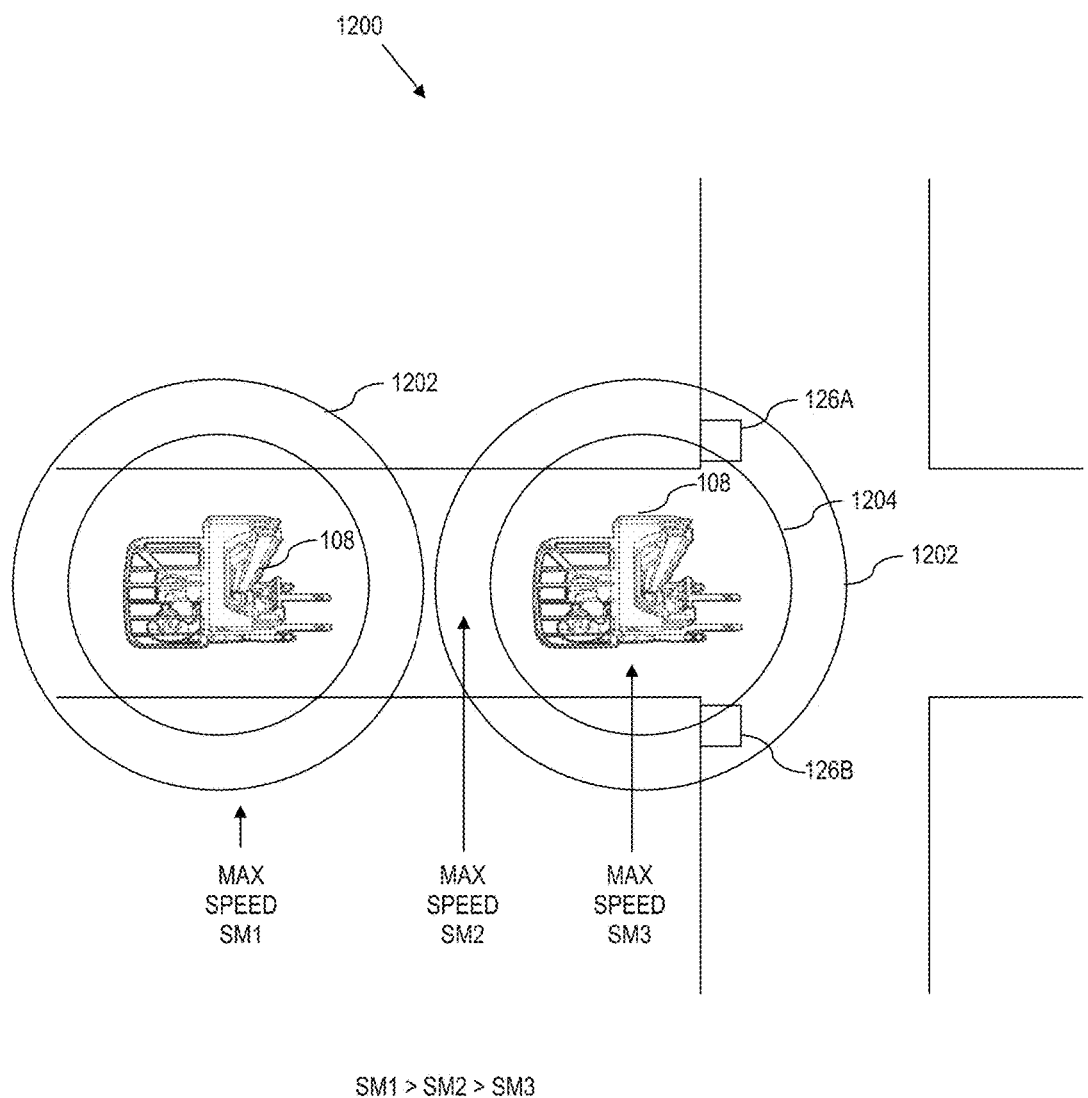
FIG. 12 is a schematic representation of the use of electronic badges to implement a geo-based notification system.

Referring to FIG. 12, in another illustrative example, the electronic badges, e.g., 126A, 126B can be installed in fixed locations, e.g., at the end of an aisle as illustrated in the environment 1200. In this example, the badges function as fixed badges or markers to designate geo-zones. For instance, an industrial vehicle 108 approaching the zone may be able to travel at a first maximum speed limit (max speed SM1) when the industrial vehicle detection zone 1202 is outside of the range of the fixed badges 126A, 126B.

Upon entering the range of the badges (e.g., within the detection zone 1202) the badge communicator 224 identifies the fixed badges 126A, 126B. The information linking device 202, using processing rules, determines based upon badge ID that the badges are end of aisle badges, and sets the maximum available speed limit of the industrial vehicle 108 to second maximum available speed limit (max speed SM2) that is less than the first maximum speed limit SM1 (e.g., by setting a set point of the industrial vehicle limiting the maximum speed). Optionally, an alarm or indicator can be activated, informing the vehicle operator of the reduced speed limit.

Optionally (or in lieu of the above), upon entering the range of the badges within an awareness zone 1204, the badge communicator 224 identifies the fixed badges 126A, 126B. The information linking device 202, using processing rules, determines based upon badge ID that the badges are end of aisle badges, and sets the maximum available speed limit of the industrial vehicle 108 to third maximum available speed limit (max speed SM3) that is less than the second maximum speed limit SM2. Optionally, an alarm or indicator can be activated, informing the vehicle operator of the yet further reduced speed limit.

Where the operator demonstrates suitable behavior e.g., by slowing down or maintaining a speed below the designated speed limit, the warnings can be suppressed. Moreover, where multiple ranges are provided, the system can implement multiple speed limit reductions, warnings, vehicle control functions, etc.

As yet another example, an operator may be required to stop and/or sound a horn at the end of an aisle. The badge communicator 224 detects the end-of-aisle badge and reports this to the information linking device 202. The information linking device 202 receives programming from the server 112, that the vehicle must stop and sound a horn at the end of the aisle. The information linking device 202 monitors the vehicle network bus 218 to determine whether the operator did in-fact stop and/or sound the horn. The information linking device logs the response to this geo-encounter. Moreover, the information linking device 202 can react, such as by stopping the industrial vehicle, sounding the horn automatically, or taking some action, such as to flash a red light informing the operator that a warehouse procedural rule was not followed. Thus, the processor of the information linking device can evaluate whether the vehicle operator sounded the horn while in the end-of-aisle geo-zone and take an action in response to the evaluation, e.g., by communicating a message to the at least one of a remote server computer, or the vehicle operator, indicating a failure to sound the horn, provide a positive reinforcement for operating the horn, log the outcome, etc.

Personalized Messaging/Role Based Messaging

Figure 13:
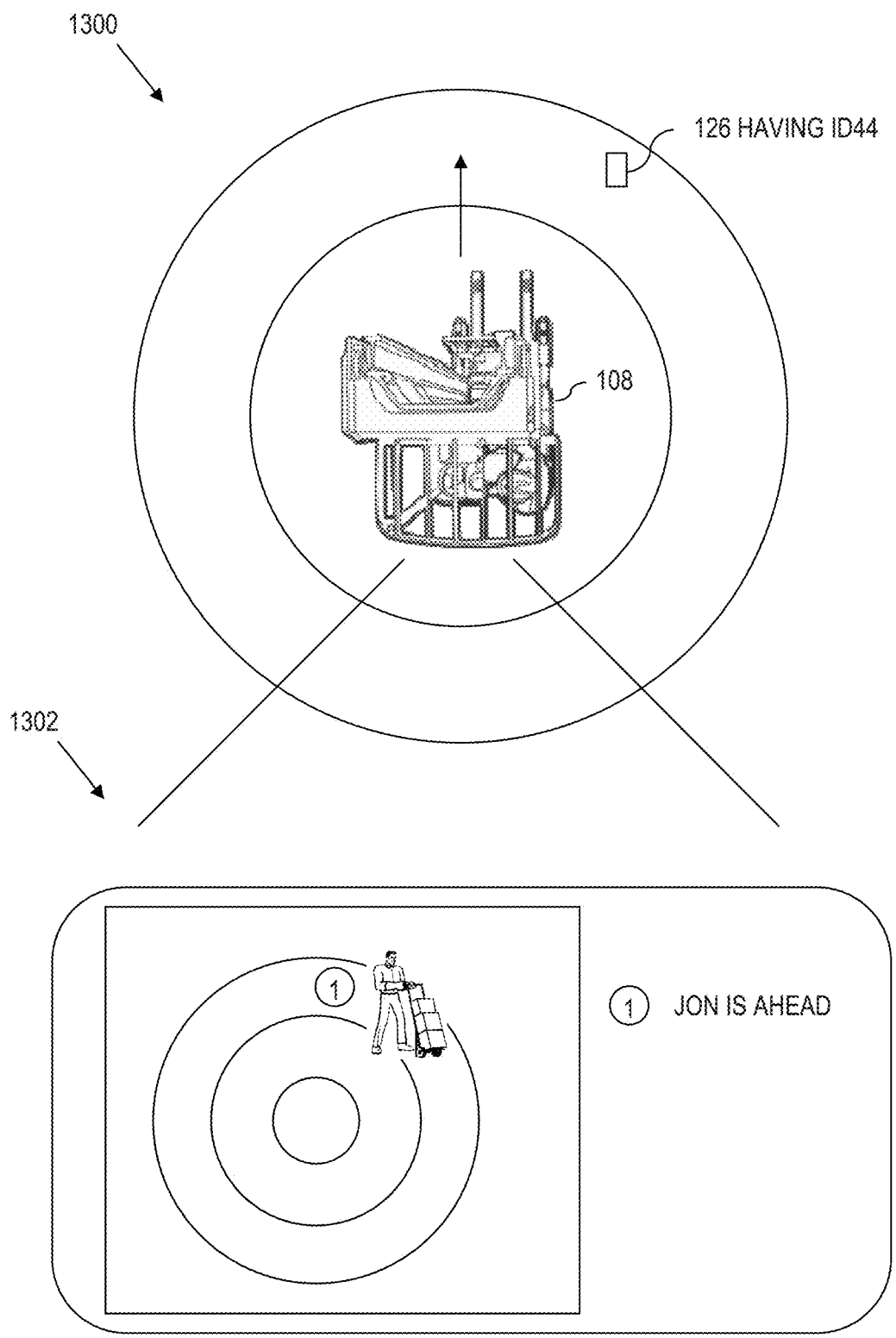
FIG. 13 is a simplified representation of a graphical user interface of an industrial vehicle, which illustrates detected electronic badges.

Referring to FIG. 13, according to certain aspects of the present disclosure, the industrial vehicle includes a graphical display 1302. The information linking device 202 receives from the server 112, a list of badge IDs, along with additional data about each badge ID. The extra information may comprise a plain-text name, role, etc. For instance, electronic badge 126, having a unique identification of ID44 could be linked to Jon, who is an order picker. When badge ID44 is detected in an awareness zone, the badge is displayed on the graphical display 1302, with context appropriate text and messaging. For instance, the display can identify not only the presence of the badge, but the personalized identification. As an example, a message such a "Jon is ahead, slow down" can be provided to the vehicle operator by the information linking device 202 sending a message, e.g., via the vehicle network bus 218, to a control module 220 that controls speakers, lights, displays, etc. In an example implementation, the badge communicator 224 detects that badge ID and distance/direction, e.g., badge ID44 is 7 meters ahead at angle 20 degrees. The information linking device 202, based upon information received from the server 112, identifies badge ID44 as Jon, and identifies Jon's role as "order picker". Based upon this information from the server 112, and based upon the location of Jon from the badge communicator 224, the information linking device 202 computes Jon's coordinates for representation on the graphical display, determines whether Jon is in the travel path of the industrial vehicle, and provides the appropriate messaging. For instance, the message "Jon is ahead" is played through a speaker associated with the display. Thus, the message, response, etc., can vary based upon the role of the detected badge. The above is merely illustrative of the types of customized messages, visual cues and audible cues that the system is capable of generating.

Figure 14:
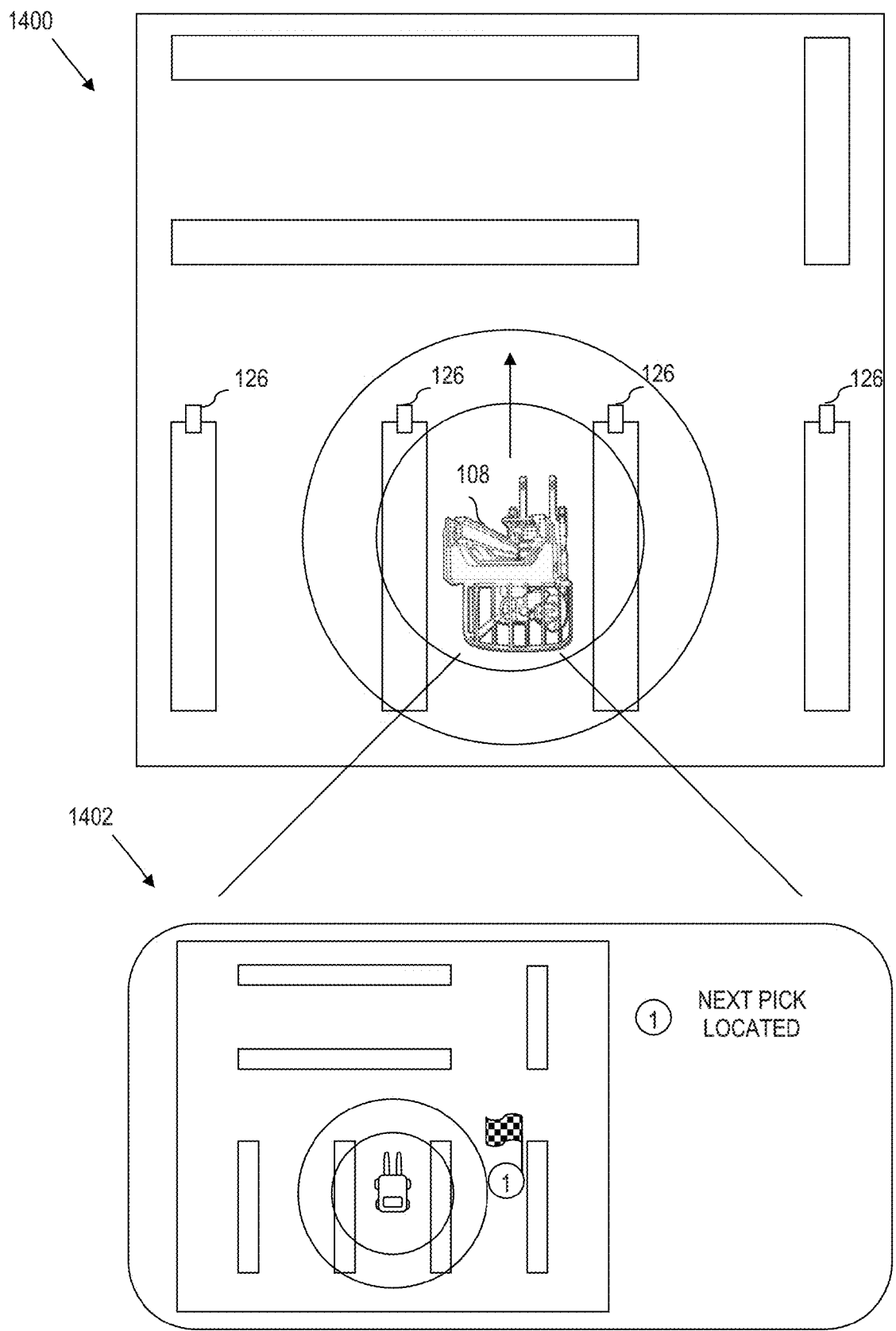
FIG. 14 is a simplified representation of a graphical user interface of an industrial vehicle, which illustrates the use of electronic badges to implement or augment geo-based location capabilities.

Referring to FIG. 14, in yet another example implementation, by placing an electronic badge 126 at a strategic location within the constrained environment (such as the example of FIG. 12), the badge communicator 224 can either replace or augment the environmental-based location tracking device 222. For instance, there may be areas of a warehouse where the environmental-based location tracking technology cannot reliably determine position, e.g., due to interference, lack or range, limits of the technology, etc. However, the ability of the badge communicator 224 to determine distance and direction to electronic badges 126 allows the use of fixed electronic badges 126 of known location to be used to identify the position of the industrial vehicle 108.

Here, the information linking device 202 receives the identification and absolute location of the fixed electronic badges 126 (i.e., fixed positioning badges). When the badge communicator 224 encounters a fixed positioning badge 126, the badge communicator 224 computes the direction and distance of the industrial vehicle 108 to the fixed positioning badge 126. The information linking device 202 uses the information from the badge communicator 224 as an offset relative to the fixed positioning badge 126 to compute the position of the industrial vehicle 108. This information can be communicated by the information linking device 202 to a display controller 220 via the vehicle network bus 218 for display to the vehicle operator on a display 1402.

Yet further, if the fixed electronic badge designates a boundary to a restricted area, e.g., a bonded area, the processor in the industrial vehicle can take an evasive maneuver to avoid the bonded area if the vehicle operator is not judged to be authorized to enter the bonded area comprising at least one of stopping the industrial vehicle and disabling the industrial vehicle.

Next Pick Locator

Moreover, the server, e.g., interacting with the warehouse management system database 124, can access the next pick location for the industrial vehicle 108, which is communicated wirelessly to the information linking device 202 for presentation on the graphical display 1402, e.g., by merging data obtained from the server and badge communicator 224 with a CAD map. In this regard, the end-of-aisle electronic badges 126 can be used to inform an operator that the industrial vehicle is in a correct aisle, or to direct the industrial vehicle as to where to go to achieve the next pick. That is, the processor of the industrial vehicle can take a predetermined action by communicating the position of the industrial vehicle based upon the electronic badge ID to a server in order to receive back instructions from the server informing the industrial vehicle of the location of a next destination for the industrial vehicle (e.g., next pick location). Likewise, the processor of the industrial vehicle can take a predetermined action by communicating the position of the industrial vehicle based upon the electronic badge ID to a server in order to receive back instructions indicating whether the industrial vehicle is in or is about to enter a correct aisle. This information can augment or be used in lieu of information obtained from an environmental based location tracking system.

Zone Ranging Based Upon Vehicle Location

Figure 15:
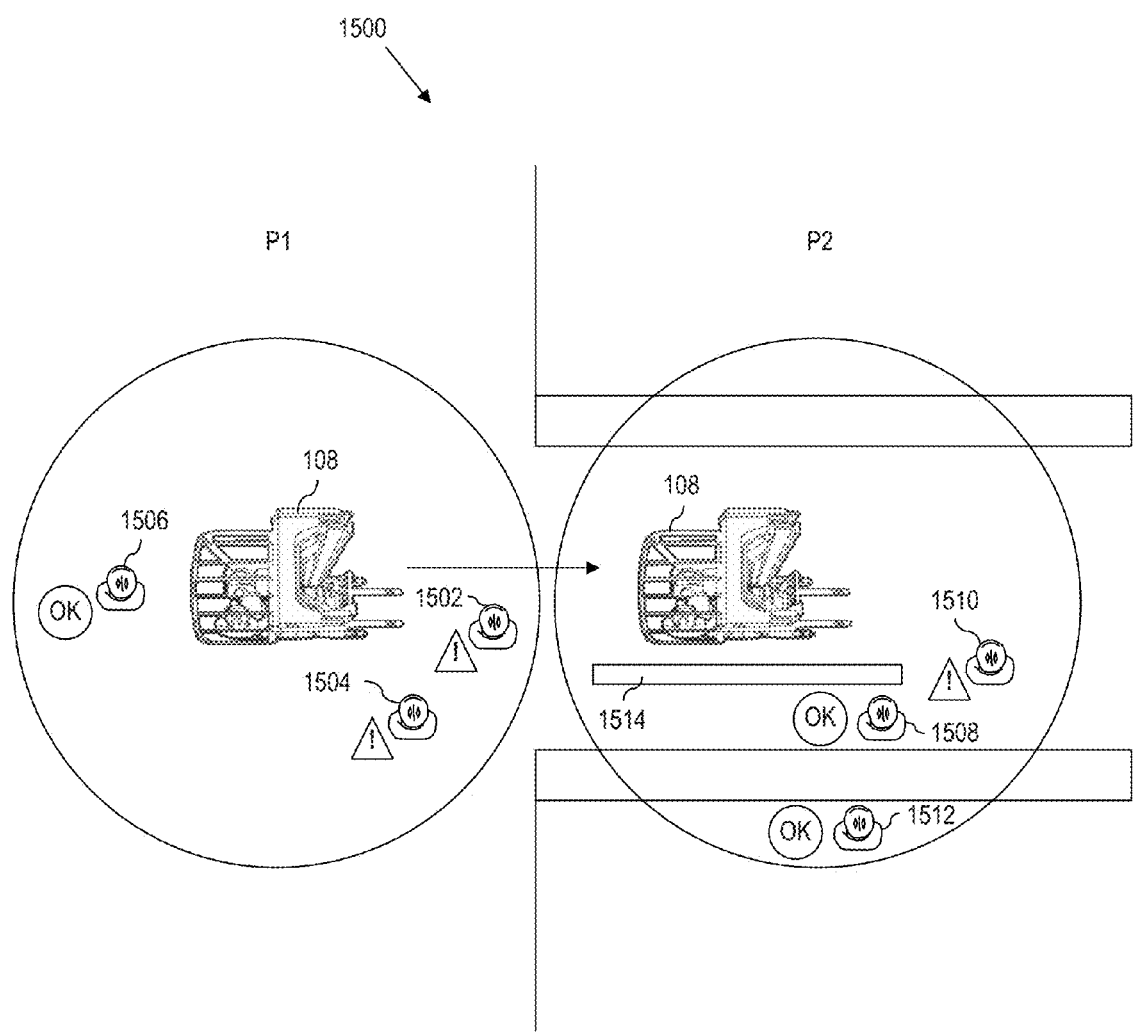
FIG. 15 is a simplified schematic diagram illustrating the use of safe zones within awareness zones.

Referring to FIG. 15, according to further aspects of the present disclosure, the system can use geo-based features to create "exclude zones" or exceptions from a generated awareness zone. By way of example, at position P1 the industrial vehicle 108 is in an open area and has a single zone solely for sake of simple discussion. In practical applications, there are one or multiple zones. Regardless, the badge communicator 224 identifies three electronic badges 1502, 1504, and 1506 and communicates the distance and direction of each of the detected electronic badges 1502, 1504, and 1506 to the information linking device 202. Here, the electronic badges are analogous to, and can include all of the features of the electronic badge 126 set out in greater detail herein.

The information linking device 202 warns the vehicle operator of electronic badges 1502 and 1504 because these electronic badges are judged to be near the travel path of the industrial vehicle. The information linking device 202 sends to the server 112 via wireless communication, information about the detection of all three electronic badges 1502, 1504, and 1506.

At position P2, the badge communicator 224 detects electronic badges 1508, 1510, and 1512 (also analogous to the electronic badge 126) and communicates the distance and direction of each of the detected electronic badges 1508, 1510, and 1512 to the information linking device 202. The information linking device 202 sends to the server 112 via wireless communication, information about the detection of all three electronic badges 1508, 1510, and 1512. The information linking device 202 can receive from the server 112 via the environmental-based location tracking 222, or otherwise determine information indicating that the electronic badge 1508 is in an exclude zone, e.g., a safe zone behind a barricade 1514. The barricade 1514 can be noted by coordinates on a CAD map or other format. Moreover, electronic badge 1512 is behind a wall 1516. As such, the information linking device 202 warns the vehicle operator of only electronic badge 1510 despite three electronic badges being in the awareness zone.

In the course of the illustrated travel path including P1 and P2, the information linking device 202 warns the vehicle operator of electronic badge 1502, 1504 and 1510 because these electronic badges 1502, 1504 and 1510 are judged to be near the travel path of the industrial vehicle 108. As noted more fully herein, a warning is dispensed to the vehicle operator (e.g., via the information linking device 202 sending a message via the vehicle network bus 218) to initiate a horn, light, graphical display, combination thereof, etc., as set out more fully herein. Notably, however, the presence and location of all detected electronic badges is logged.

Overtaking Regulation

In the daily operation of a fleet of industrial vehicles, there are occasions where an industrial vehicle needs to pass/overtake another industrial vehicle. Aspects herein provide overtaking regulation.

In general, a computer-implemented process for authorizing a passing maneuver comprises receiving, by a processor, a first message, a second message, and a third message. Here, the first message indicates a position of a first industrial vehicle in a work environment. The second message indicates a position of an electronic badge that is detected by the first industrial vehicle. The third message indicates a position of a second industrial vehicle within the work environment. The computer-implemented process also comprises determining by the processor, that the second industrial vehicle intends to pass the first industrial vehicle, and determining, by the processor, an instruction comprising a select one of an instruction related to a passing maneuver or an instruction not to pass based upon the position of the first industrial vehicle, the position of the electronic badge, and the position of the second industrial vehicle. The computer-implemented process yet further comprises communicating the instruction to the second industrial vehicle, wherein the second industrial vehicle performs the received instruction in response to the communication.

For instance, the first message can be generated based upon an environmental-based location tracking device on the first industrial vehicle identifying the position of the first industrial vehicle. The second message can be generated by utilizing a badge communicator on the first industrial vehicle to detect the presence of an electronic badge 126, e.g., worn by the vehicle operator, a nearby pedestrian, etc. If the electronic badge 126 is worn by the vehicle operator, the first industrial vehicle may detect that the operator has stepped off of the first industrial vehicle, e.g., to pick an item. Likewise, the third message can be generated based upon an environmental-based location tracking device on the second industrial vehicle identifying the position of the second industrial vehicle.

Alternatively, the first and/or third message can be generated based upon relative position information, such as by equipping each of the first and second industrial vehicles with an electronic badge 126 and a corresponding badge communicator 224. In this regard, each of the industrial vehicles is capable of determining a relative position of the other industrial vehicle using techniques set out more fully herein.

In an example configuration, the processor can determine that the second industrial vehicle intends to pass the first industrial vehicle by receiving by the processor, a first position of the second industrial vehicle, receiving by the processor, a second position of the second industrial vehicle, computing by the processor, a direction of travel of the second industrial vehicle, and predicting that the direction of travel of the second industrial vehicle will require the second industrial vehicle to pass the first industrial vehicle.

Notably, the system for authorizing a passing maneuver can be implemented using a central remote server computer. For instance, the processor that receives the first, second, and third messages may be a remote server computer such as the server 112 (FIG. 1). Here, the messages are received at the server computer from at least one of the first industrial vehicle or the second industrial vehicle. For instance, the first industrial vehicle may wirelessly communicate the first message and the second message to the server computer, and the second industrial vehicle may communicate the third message to the server computer. However, where the industrial vehicles are capable of local, direct communication, it is possible that the server may receive the messages from one of the industrial vehicles, e.g., where one industrial vehicle acts as a relay or otherwise gathers all of the necessary information. Here, the server transmits the instruction for delivery to the second industrial vehicle, e.g., by communicating directly with the second industrial vehicle, or by communicating the instruction to the first industrial vehicle for relay to the second industrial vehicle.

In this example configuration, the server can continuously monitor the positions of industrial vehicles in a fleet of industrial vehicles, and judge that a passing maneuver may be desired based upon vehicle position, speed and travel direction. For instance, the server computer can utilize a map of a portion of a warehouse to understand that the first industrial vehicle is parked in an aisle. If the vehicle operator is detected off of the industrial vehicle, then the server computer can infer that the operator is an order picker performing a pick operation in an illustrative example. The server computer can also query resources such as the WMS database 120 (FIG. 1) to establish a confidence that the operator is performing a pick operation by matching the industrial vehicle location to a pick order.

In alternative configurations, there is no need for a server computer, such as where the first industrial vehicle and the second industrial vehicle are capable of temporary local communication. That is, the computer-implemented process for carrying out an overtake maneuver can be carried out independent of interaction with a remote server computer. For instance, in a first example implementation, the processor comprises the control module 206 (FIG. 2) of the first industrial vehicle, i.e., the industrial vehicle to be passed/overtaken. Here, the first message is received, e.g., from the environmental-based location tracking device 222 (FIG. 2) of the first industrial vehicle. Where an environmental based location tracking device 220 is unavailable to the first industrial vehicle, then a localized, relative coordinate system can be created, e.g., by assuming that the first industrial vehicle is at a known position, e.g., an origin. The second message is received from the badge communicator 224 (FIG. 2) of the first industrial vehicle as described more fully herein. The third message can be received from the second industrial vehicle via direct local communication independent of the server 112 (FIG. 1), such as where each industrial vehicle includes an electronic badge 126 and badge communicator 224. That is, the badge communicator 224 on the first industrial vehicle can detect an electronic badge 126 on the second industrial vehicle. As another example, a badge communicator 224 on the second industrial vehicle can detect an electronic badge on the first industrial vehicle, and send a local message to the first industrial vehicle, by using the badge communicators 224 and badges, as described more fully herein, or by otherwise creating a temporary local network using UWB, or other communication technology.

Likewise, the processor can be implemented by the control module 206 (FIG. 2) of the second industrial vehicle, i.e., the industrial vehicle intending to pass/overtake the other industrial vehicle. For instance, the second industrial vehicle can receive a local communication from the first industrial vehicle designating the position of the vehicle, pedestrian wearing an electronic badge, or both, in a manner analogous to that noted above. Moreover, the second industrial vehicle can identify the location of the first industrial vehicle via an electronic badge 126 associated with the first industrial vehicle and the pedestrian, e.g., order picker wearing an electronic badge, both using a badge communicator 224 as set out more fully herein. In this example implementation, the second industrial vehicle can make the decision as to whether to overtake the first industrial vehicle by gathering all relevant data directly.

By way of an illustrative example, an electronic badge 126 can be attached or otherwise mounted to each of the first and second industrial vehicles. When the industrial vehicles approach each other, the badge communicator 224 on each industrial vehicle recognizes the electronic badge on the other industrial vehicle. Thus, a temporary, short-range, direct vehicle-to-vehicle mesh communication network is established between the first industrial vehicle and the second industrial vehicle, by communicating from the electronic badge on the first industrial vehicle to the badge communicator on the second industrial vehicle, and communicating from the electronic badge on the second industrial vehicle to the badge communicator of the first industrial vehicle.

This interaction can trigger a program to begin monitoring the vehicle-vehicle interaction, including taking action in response to an overtake maneuver. For instance, the electronic badge 124 on the first industrial vehicle can identify itself as an order picker industrial vehicle. The second industrial vehicle can read this badge ID, and begin a program to monitor for an overtake scenario. The industrial vehicles can also create a temporary, short-range, direct vehicle-to-vehicle mesh communication network and begin passing information back and forth.

As noted more fully herein, the badge communicator may detect the position of the electronic badge 126 as a relative offset to the position of the first industrial vehicle. An environmental-based location tracking device can be used for determining or otherwise computing an absolute location of the first industrial vehicle. In this regard, a processor, e.g., part of the information linking device, performs the operation of computing an absolute position of the electronic badge 126 based upon the absolute position of the industrial vehicle and the detected offset. As such, the server receives from the first industrial vehicle (e.g., via the information linking device), a message indicating the absolute position of an electronic badge 126 that is detected by the first industrial vehicle. Alternatively, the position can be communicated as an absolute position of the industrial vehicle, and a relative offset of the badge to the industrial vehicle.

Where the server determines that it is okay for the second industrial vehicle to pass the first industrial vehicle, the server may perform an operation comprising generating a control message based upon a desired passing maneuver, and sending the control message to at least one electrical component of the second industrial vehicle. Thus, the second industrial vehicle processes the control message to directly control (e.g., controls at least one of speed and travel path of the second industrial vehicle while passing the first industrial vehicle), set a limit (e.g., maximum allowable speed) to an operational parameter of the second industrial vehicle, communicate a message to an operator of the second industrial vehicle, perform a combination thereof, etc. For instance, the second industrial vehicle 108B can receive an information message, e.g., from the server 112 (FIG. 1), the first industrial vehicle 108 via the badge communicator 224, generated directly on the second industrial vehicle itself, etc. In response to processing the information message, a processor on the second industrial vehicle 108B generates on a display, a map of the work environment, first indicia representing the position of the first industrial vehicle and second indicia representing the position of the electronic badge detected by the first industrial vehicle. The server then detects that the second industrial vehicle has passed the first industrial vehicle, and sends a message to the second industrial vehicle resetting the second industrial vehicle back to its state before processing the control message.

In a manner similar to the example discussed with reference to FIG. 13, the server can send an information message to the second industrial vehicle, where the second industrial vehicle processes the information message and generates on a display, a map of the aisle, first indicia representing the location of the first industrial vehicle and second indicia representing the location of the badge detected by the first industrial vehicle.

It is conceivable that the server will also receive at least one message from a third industrial vehicle indicating that the third industrial vehicle is in the aisle of the first industrial vehicle (e.g., such that two or more vehicles want to pass the parked vehicle at or near the same time). In this instance, the server determines that the third industrial vehicle intends to pass the first industrial vehicle in the aisle in close proximity in time to the intent of the second industrial vehicle to pass the first industrial vehicle. Moreover, the server arbitrates a priority to pass the first industrial vehicle, and sends a message to the second industrial vehicle and the third industrial vehicle with the priority to pass the first industrial vehicle. For instance, where it is judged that the order picker is out of the aisle, e.g., the order picker is in a bin, back on the parked vehicle, etc., the server may allow both the second industrial vehicle and the third industrial vehicle to pass the first industrial vehicle at the same time where the server determines that the aisle is wide enough to allow both the second industrial vehicle and the third industrial vehicle to pass the first industrial vehicle based upon the position of the first industrial vehicle in the aisle. Moreover, the server can set a priority in passing/overtaking the parked vehicle, e.g., based upon travel direction or other factors.

In an alternative configuration, the system may eliminate the need to communicate with the server 112, such as where the industrial vehicles 108 and/or electronic badges 126 can form a mesh network for local communication with each other. Here, a processor on one of the industrial vehicles, e.g., the parked industrial vehicle, can perform functions analogous to that of the server as set out in greater detail herein.

As an example, industrial vehicle 108A informs industrial vehicle 108B directly that an operator wearing an electronic badge 126 is present in the area and instructs industrial vehicle 108B to "slow down". By way of illustration, a mesh network can be temporarily created by mounting an electronic badge 126 on each industrial vehicle, and using the electronic badges 126 and badge communicators 224 to form direct local communication. Alternative technologies can also/alternatively be utilized to create the mesh network. Additionally, in this example implementation, since a map is located in the industrial vehicles, along with the location-based, and other rules, the industrial vehicle 108B doesn't need to communicate back to the server 112 to find out if a pedestrian is in a zone. It can make that decision itself, e.g., based upon a communication from industrial vehicle 108A.

Picker Around Acknowledgement for Overtaking Regulation

Figure 16:
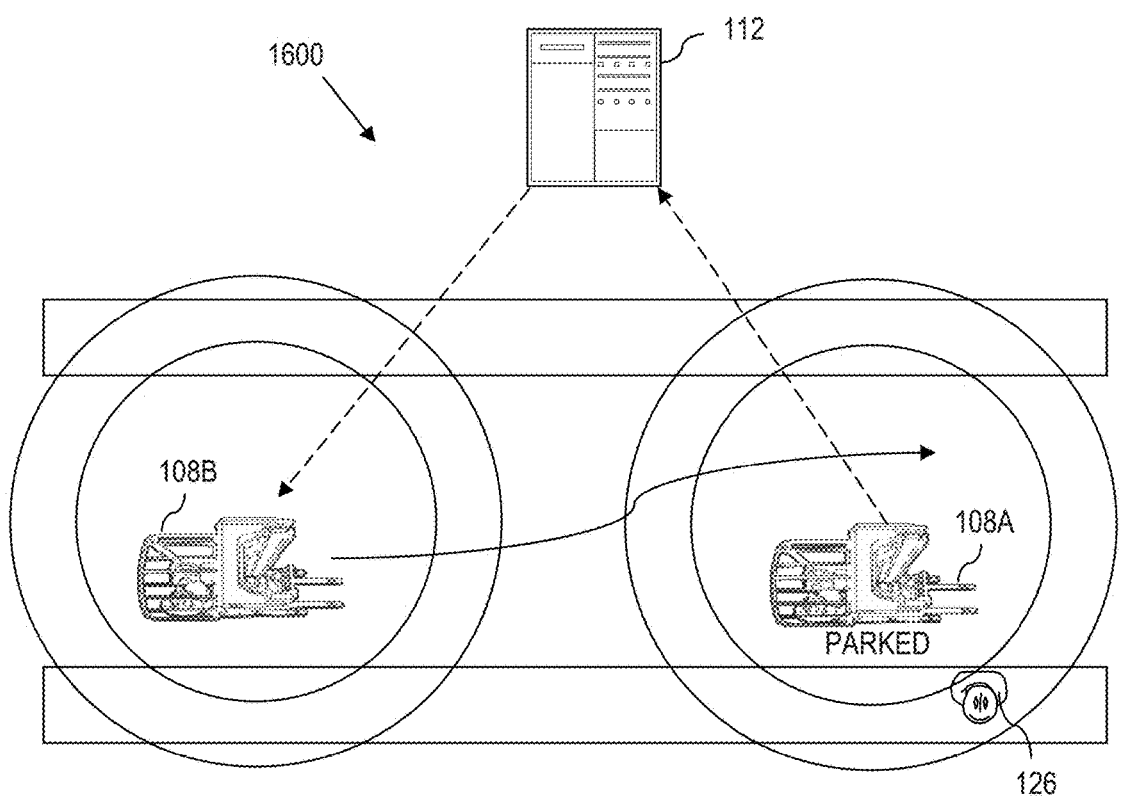
FIG. 16 is a simplified schematic representation of a "picker around" pass-around maneuver of an industrial vehicle.

Referring to FIG. 16, according to still further aspects of the present disclosure, an electronic badge 126 worn by a worker implementing a pre-defined role, e.g., an order picker, can affect overtaking actions where an industrial vehicle intends to pass another industrial vehicle. As illustrated, the first industrial vehicle 108A is parked because an order picker wearing an electronic badge 126 is in a bin picking an item. The server 112 receives a communication from the first industrial vehicle 108A indicating that the order picker has stepped off the industrial vehicle, and is in the bin/racking. Assume a second industrial vehicle 108B wants to pass the industrial vehicle 108A. It is possible that the operator of the second industrial vehicle 108B cannot see the order picker. Moreover, the order picker may be out of range of the badge communicator of the second industrial vehicle 108B. Yet further, the order picker may pop out from the racking abruptly.

As such, the first industrial vehicle 108A detects that the order picker has stepped off the industrial vehicle 108A. The industrial vehicle 108A sends a message to the server 112 via its information linking device 202. The message may be basic, that an order picker is off of the vehicle. Alternatively, the message can identify the location of the order picker, as monitored by the badge communicator 224 of the first industrial vehicle 108A.

Meanwhile, the environmental location based location tracking 222 of the industrial vehicle 108B informs the server 112 that it is driving down the aisle. In response thereto, the server 112 informs the industrial vehicle 108B that an order picker is nearby and to pass with caution, e.g., via visual cues, messages, etc. The server 112 also informs the industrial vehicle 108A that industrial vehicle 108B is about to pass it. Further, the industrial vehicle 108A relays a message to the order picker to be careful coming out of the racking because another industrial vehicle is nearby.

In an example implementation, the server 112 can also authorize the industrial vehicle 108B to overtake the parked industrial vehicle 108A along a specified path that maximizes at least one parameter based upon the position of the order picker, industrial vehicle 108A and industrial vehicle 108B.

In an alternative configuration, the system eliminates the need to communicate with the server 112, such as where the industrial vehicles 108 and/or electronic badges 126 form a mesh network for local communication with each other, as described more fully herein.

Authorization Device

Referring to the FIGURES generally, as noted in greater detail herein, the vehicle operator can wear an electronic badge 126. This allows the electronic badge 126 to function as a vehicle authorization/authentication/control device. Here, the industrial vehicle 108 can dynamically enter various modes depending upon the state of the vehicle operator. For instance, an electronic badge 126 can pair with the industrial vehicle 108. If the electronic badge 126 is detected on the industrial vehicle 108, the industrial vehicle 108 can switch on. If a mobile electronic badge 126 is in close proximity to the industrial vehicle 108, e.g., as worn by an order picker that is operating the industrial vehicle 108, the industrial vehicle 108 can automatically switch to a standby mode. If the electronic badge 126 is detected away from the industrial vehicle 108 (e.g., a lunch break), the vehicle can switch off. Moreover, where an electronic badge 126 is paired with the industrial vehicle 108, this can prevent another person from driving away with, or otherwise using the industrial vehicle 108 when the industrial vehicle 108 is in a stop mode or standby mode. Here, by associating a vehicle login ID to an electronic badge 126 ID, an operator can remain logged into a vehicle without physically being on the industrial vehicle 108.

Warehouse Aisle Overtake/Collision Warning

Figure 17:
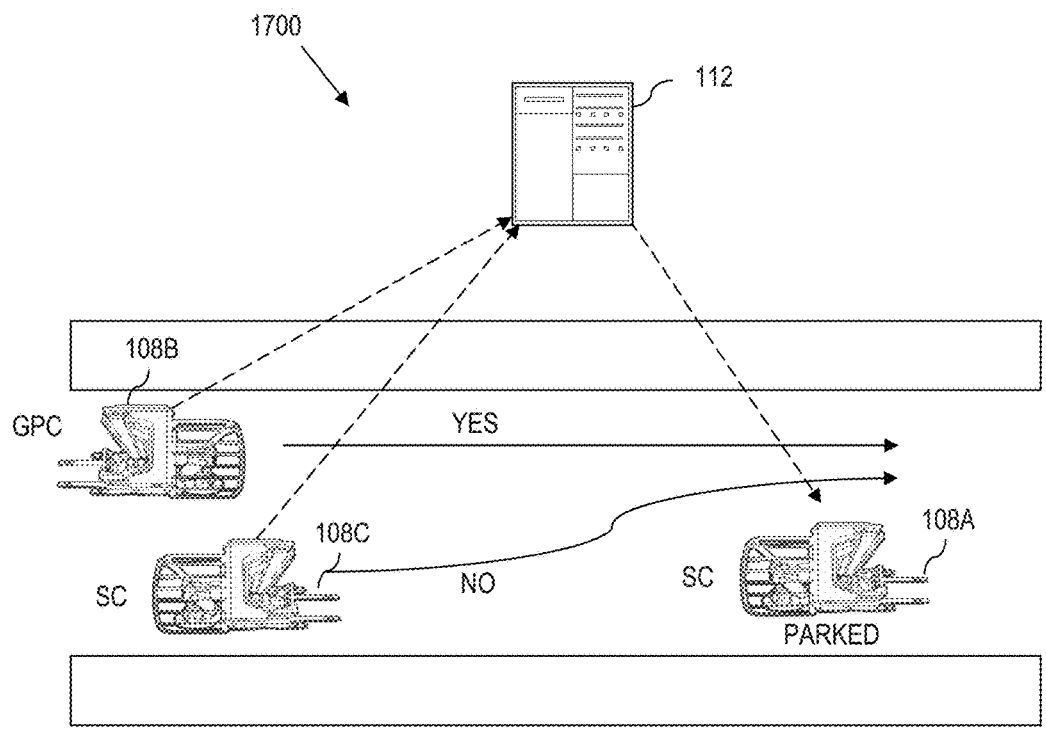
FIG. 17 is a simplified schematic representation of a pass maneuver of an industrial vehicle.

Referring to FIG. 17, a system can be used for industrial vehicle collision warning. Note that industrial vehicle 108A is parked and its (absolute) coordinates are communicated to the server 112. In the illustrated example, industrial vehicle 108B and industrial vehicle 108C both want to overtake the parked industrial vehicle 108A. Both industrial vehicle 108B and industrial vehicle 108C communicate their position, travel direction, speed, etc., to the server 112 (e.g., via their onboard environmental location tracking 222 and information linking device 202 as set out further herein), which tracks the activity in the aisle. The server 112 receives a message of intent, computes the intent or otherwise infers the intent of the industrial vehicle 108B and industrial vehicle 108C to overtake industrial vehicle 108A. The server 112 sends a message to industrial vehicle 108A indicating that vehicles are approaching.

The server 112 then computes whether the two industrial vehicles 108B and 108C can pass industrial vehicle 108A side-by-side. In this example, it is assumed that the vehicles 108B and 108C would not fit next to each other when passing industrial vehicle 108A. As such, a possible collision event could occur. In response thereto, the server 112 takes appropriate action.

For instance, as illustrated, the server 112 instructs and/or controls the industrial vehicles 108B and 108C to reduce speed. The server 112 determines that industrial vehicle 108B is most suited to pass first, so the server 112 instructs industrial vehicle 108B to overtake industrial vehicle 108A. The server 112 likewise instructs, commands, or otherwise controls industrial vehicle 108C to not pass until industrial vehicle 108B has cleared out of the way.

In yet another example, an industrial vehicle 108A is parked at the edge of the aisle on one side thereof, and the server 112 knows this absolute position of the vehicle 108. The server 112 also knows the width of this particular aisle and of all relevant industrial vehicles 108. When an industrial vehicle approaches, the server 112 knows that the approaching vehicle is in the same aisle with the parked vehicle 108A. Then the server 112 calculates if these two particular vehicle types would fit next to each other into the aisle. For example, assume that a parked vehicle is a first forklift (width: 100 centimeters (cm)). The approaching vehicle is a second type of forklift (width 80 cm). These vehicles would fit, because the aisle is 200 cm wide in this example. If the approaching vehicle was also the first type of forklift, they would not fit next to each other into the aisle because the aisle is 200 cm and the combined width of both vehicles is 200 cm.

In an alternative configuration, the system eliminates the need to communicate with the server 112, such as where the industrial vehicles 108 and/or electronic badges 126 form a mesh network for local communication with each other, as described more fully herein.

Figure 18:
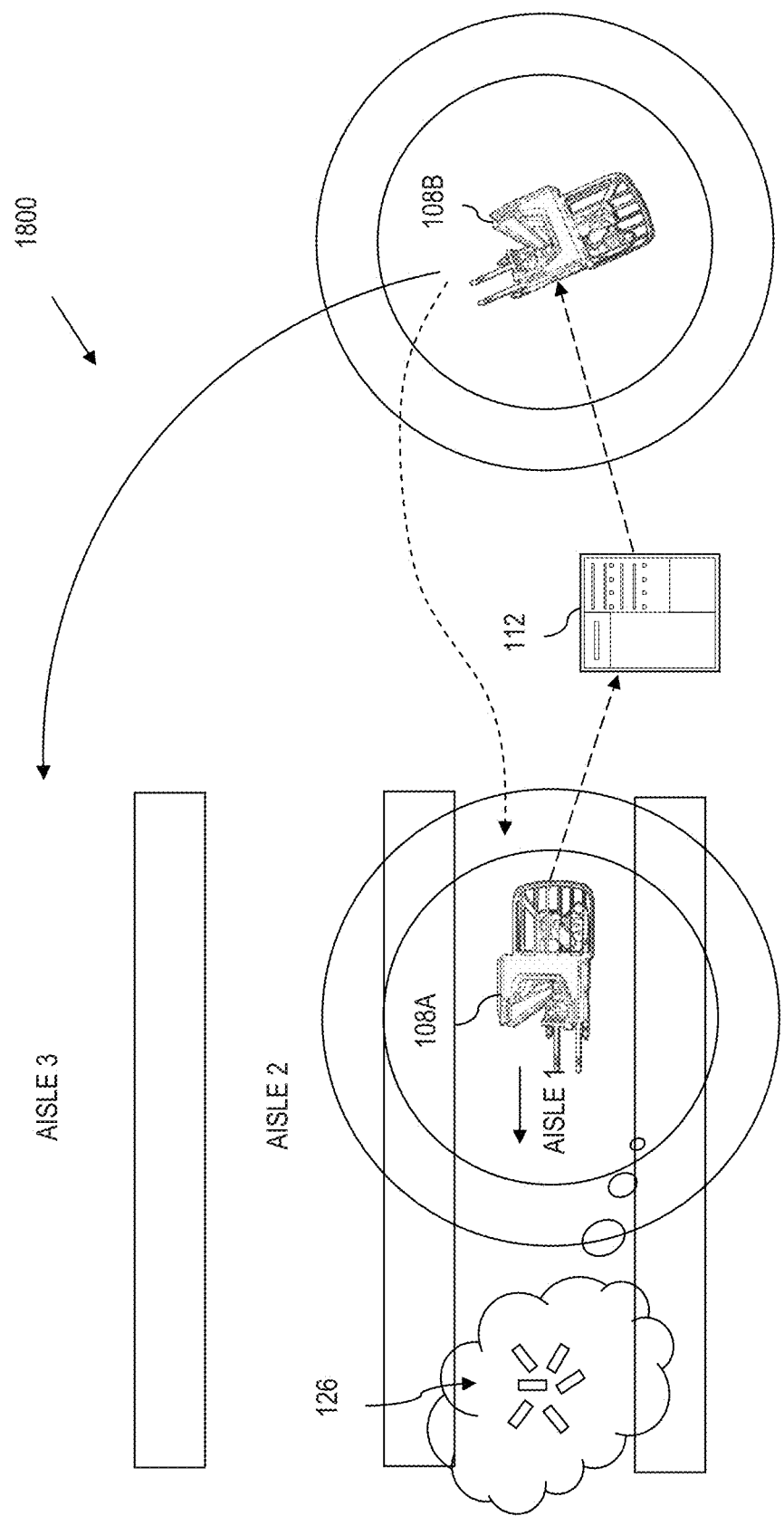
FIG. 18 is a simplified schematic representation of the use of electronic badges to create information including a heat map, e.g., to implement a detour for approaching industrial vehicles, etc.

Referring to FIG. 18, illustrates the avoidance of aisle congestion due to pedestrians. As illustrated, a first industrial vehicle 108A in AISLE 1 reports to the server 112, a large number of electronic badges 126. As with other examples throughout, this is accomplished using a badge communicator 224 to communicate with electronic badges 126. The badge communicator 224 passes the collected information to the information linking device 202, which passes the information to the server 112. Similarly, the environmental-based location tracking system independently determines that industrial vehicle 108A is in AISLE 1, and this information is also passed to the server 112 via the information linking device 202.

Assume for example, the industrial vehicle 108B wants to travel down AISLE 1. The information linking device 202 and environmental-based location tracking device 222 of the industrial vehicle 108B communicate its position to the server 112. The server is informed, and infers or otherwise determines that the industrial vehicle 108B is intent on navigating down AISLE 1. However, due to the pedestrian congestion, the server 112 instructs the industrial vehicle 108B to use AISLE 3 instead.

In an alternative configuration, the system eliminates the need to communicate with the server 112, such as where the industrial vehicles 108 and/or electronic badges 126 form a mesh network for local communication with each other, as described more fully herein.

Response Detection

In an example implementation, the control module 206 of the information linking device 202 synthesizes information from the server 112, from the industrial vehicle 108 (e.g., via reading vehicle operational data from the controllers 220 via the vehicle) via the vehicle network bus 218 (e.g., CAN bus), from the environmental-based location tracking 222, and from the badge communicator 224 to monitor the response of the vehicle 108 to a detected electronic badge 126. For instance, if a vehicle operator is warned that an electronic badge 126 is in a warning zone, and the vehicle operator slows down, the decrease in speed is detectable from a controller 220 of the industrial vehicle 108. As such, upon detecting electronic badges 126, the information linking device 202 begins to monitor industrial vehicle operational data (speed, change in speed, abruptness/smoothness of corrective action, steer angle, use of the horn, travel direction, lift height, combinations thereof, etc.) to score a response to each electronic badge 126. The score, or score data is communicated back to the server 112, which can process, aggregate, and compare scores across multiple vehicles, vehicle types, operators, etc.

Indirect Vehicle Operator Monitoring

A vehicle operator-worn mobile electronic badge 126 cooperates with the badge communicator 224, and hence the information linking device 202 on the industrial vehicle 108 to provide details about the activity of the vehicle operator that are not otherwise possible. For instance, the electronic badge 126 can track steps, lifting actions, stairs climbed, heart rate, etc., and send that information to the server 212 via the badge communicator 224 and information linking device 202.

Example Electronic Badge

Figure 19:
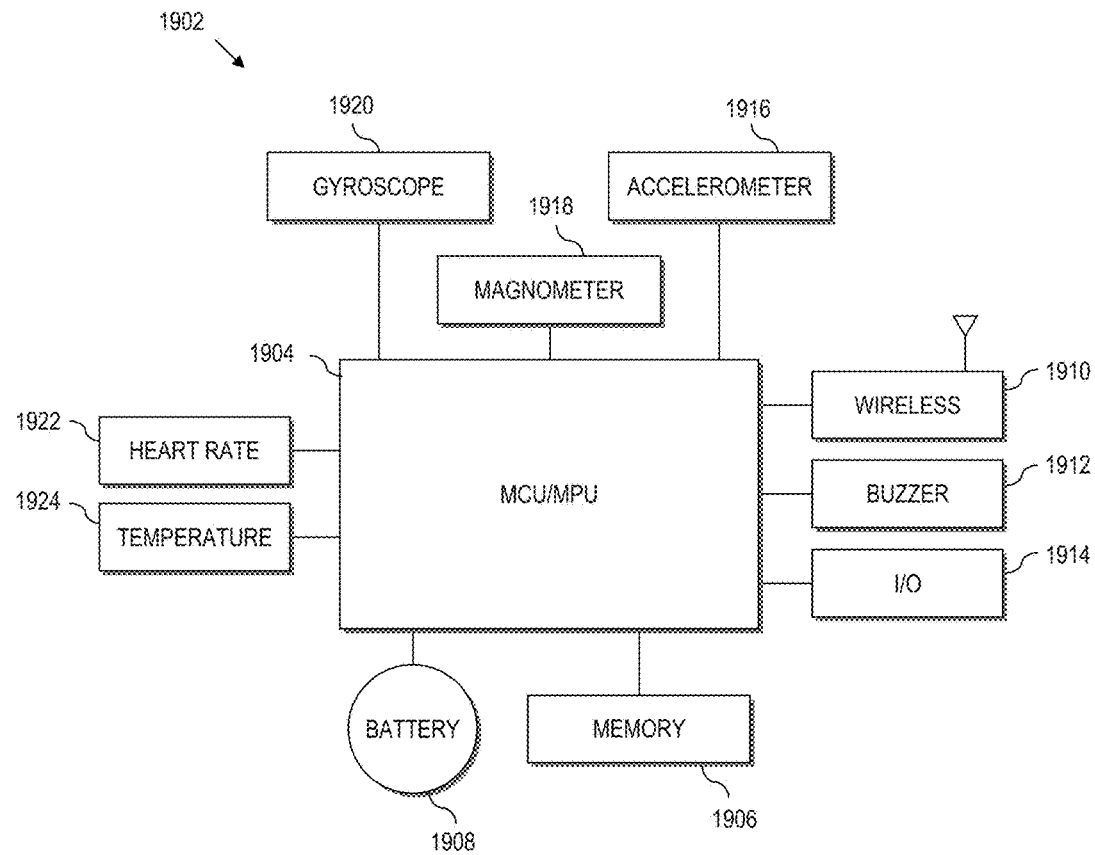
FIG. 19 is a block diagram of an example electronic badge according to aspects of the present disclosure.

Referring to FIG. 19, a badge 1902 (e.g., which can be utilized to implement the badge 126 set out more fully herein), includes a controller 1904 having a processor coupled to memory 1906. The memory 1906 stores the program code that causes the badge to communicate with corresponding badge communicators as described more fully herein. The processor of the controller 1904 also executes code in the memory 1906 to read sensor data, to interact with input/output, etc. In this regard, the memory 1906 further stores sensor data at least until such data is communicated to a badge communicator. The badge 1902 also includes a battery 1908 to power the badge 1902. In this regard, the schematic representation of the battery 1908 is intended to include a battery, and/or a battery along with battery management circuitry, e.g., to conserve power, and perform other battery management functions.

The badge 1902 also includes a wireless device 1910 coupled to the controller 1904, e.g., an UWB radio compatible with the badge communicator on the industrial vehicle. Moreover, the badge includes input and/or output devices, e.g., a buzzer 1912 or other I/O device 1914, e.g., tactile device, button, display, light, speaker, etc. For instance, an LED indicator can be provided on the badge 1902 that illuminates when the pedestrian is in a predefined zone of a badge communicator 224 on an industrial vehicle 108.

The example badge 1902 also includes at least one inertial sensor coupled to the controller 1904. For instance, as illustrated, there are three inertial sensors, including an accelerometer (e.g., 3-axis accelerometer) 1916, a magnetometer 1918, and a gyroscope (e.g., a three-axis gyroscope) 1920. The accelerometer 1916 measures physical acceleration. Comparatively, the gyroscope 1920 measures angular velocity. The magnetometer 1918 acts as a compass, which is useful to determine orientation. In practice, a badge 1902 need not include all three inertial measurement technologies.

Yet further, additional sensors can be coupled to the badge 1902. For sake of illustration, the badge 1902 also includes a heart rate sensor 1922 coupled to the controller 1904 to capture the measured heart rate of the individual wearing the badge 1902. Moreover, an optional temperature sensor 1924 can be coupled to the controller 1904 to capture the measured body temperature of the individual wearing the badge 1902. In practice, other sensor technologies can also and/or alternatively be integrated into the badge. As such, the electronic badge 126, 1902 can be used as a physical tracker, counting the number of steps that the vehicle operator, order picker, or other warehouse worker takes. The electronic badge 126, 1902 can also detect the number of times the worker bends, climbs stairs, etc. The mobile electronic badge 126, 1902 can also keep track of the time while the operator is off the industrial vehicle 108, e.g., time walking, carrying loads, etc.

In certain implementations, the electronic badge 126, 1902 can be a hand-held portable device, such as a smart phone, tablet, palm computer, etc. For instance, a smartphone provides a convenient badge because the typical smartphone already includes a display, speaker, accelerometer, processor, compass, etc. Moreover, most smart phones include or can be equipped with Bluetooth, UWB, Wi-Fi, cellular, and other radio technologies. Yet further, smart phones facilitate rich integration by adding GPS, direct communication with a server Referring to the FIGURES generally, a system for controlling an industrial vehicle 108 is realized. The system includes an industrial vehicle equipped with an information linking device 202 that wirelessly communicates (e.g., via the transceiver 204) with a server 112 over a first wireless communication link (e.g., to access point(s) 110, which complete the communication via components 106 and network 104. The industrial vehicle 108 also includes a badge communicator 224 that communicates with electronic badges (e.g., 126, 1902) that are in short range proximity of the industrial vehicle 108 over a second communication link different from the first communication link. For instance, the badge 126, 1902 communicates with the badge communicator 224 via UWB radios. In this example implementation, an industrial vehicle operator wears the badge 1902. As such, the badge 1902 is referred to as an operator badge.

The system also includes a controller coupled to memory (e.g., the control module 206 of the information linking device 202), wherein the controller executes program code stored in the memory to control the operating state of the industrial vehicle 108 based upon the operator badge. The operating state of the industrial vehicle 108 is controlled by identifying that an operator possessing the operator badge 1902 has approached the industrial vehicle 108 to log onto the industrial vehicle. In an example implementation, the control module 206 determines that the operator intends to log onto the industrial vehicle 108 where the industrial vehicle is currently not paired with another operator, and the presence of the operator badge 1902 is detected as being physically present on the industrial vehicle 108.

For instance, using a communication of the operator badge 1902 with the badge communicator 224, which is conveyed to the information linking device 202, the control module 206 computes the relative position of the operator badge relative to the known position of the badge communicator 224. Also knowing the dimensions and layout of the industrial vehicle operator's compartment, the control module 206 determines that the operator is within the operator's compartment. As an alternative, sensors such as a presence switch or presence sensor (e.g., one of the sensors 214) is used to sense the presence of the vehicle operator in the operator's compartment. In yet an alternative implementation, vehicle sensors 214 are used to corroborate computation based upon the position calculation of the vehicle operator based upon the computed position of the badge 1902.

The control module 206 communicates with the server 112 via the transceiver 204 of the information linking device 202 to authenticate the operator as authorized to operate the industrial vehicle. This can be accomplished by receiving a badge identification (badge ID) wirelessly transmitted from the badge 1902 to the badge communicator 224. The badge communicator 224 passes the badge ID to the information linking device 202, e.g., across the vehicle network bus 218. Upon the control module 206 determining that the operator is authorized to operate the industrial vehicle, the information linking device 202 pairs the operator badge with the industrial vehicle. For instance, in an example implementation, the badge-ID is linked to a person (personal badge). This information is stored on the server and communicated to badge communicator.

In this regard, the control module 206 controls the industrial vehicle based upon a location of the operator badge 1902 relative to the industrial vehicle 108. For instance, as set out in greater detail herein, in example implementations, the badge communicator 224 includes multiple antennae 226 that allows relative position determination of the badge 1902. The system further turns the industrial vehicle 108 on when the badge communicator 224 detects the operator badge 1902 is on the industrial vehicle 108. For instance, the control module 206 instructs the vehicle power enable/conditioning circuit 208 to provide power to the industrial vehicle 108 as described more fully herein.

The system further turns the industrial vehicle 108 into a standby mode where the badge communicator 224 detects the operator badge 1902 in proximity to the industrial vehicle 108, but not on the industrial vehicle 108. For instance, in standby mode, the control module 206 controls the industrial vehicle via communication with the controllers 220 across the vehicle network bus 218, via selective control of the vehicle via the vehicle power enable/conditioning circuitry 208, combinations thereof, etc. This allows the industrial vehicle to be powered, but certain features restricted in functionality or prevented from functioning. For instance, vehicle forks, drive, etc., can be disabled from their current position, a brake can automatically be set, etc. In certain example implementations, the controller is further programmed for locking the industrial vehicle from use by another operator so long as the industrial vehicle is paired with the operator badge and the industrial vehicle is in standby mode.

The system further turns the industrial vehicle 108 to a stop mode when the badge communicator 224 no longer detects the operator badge 1902 in proximity to the industrial vehicle 108. This lack of communication may be further based upon a predetermined time, e.g., out of range for more than 10 minutes, etc. This can be used to reserve the industrial vehicle or to keep the industrial vehicle paired with the vehicle operator for brief durations where the vehicle operator must step away from the industrial vehicle, e.g., for a short break, etc. In example implementations, the controller is further programmed for locking the industrial vehicle from use by another operator so long as the industrial vehicle is paired with the operator badge and the industrial vehicle is in stop mode.

According to further aspects of the present disclosure, the operator badge 1902 includes at least one inertial sensor 1906, 1908, 1920 that tracks movement of the vehicle operator by generating movement data. In this example configuration, the badge controller 224 reads the movement data collected by the inertial sensor and wirelessly transmits the collected movement data to the badge communicator of the industrial vehicle. The badge controller 224 of the industrial vehicle 108 communicates the collected movement data to the information linking device 202. Moreover, the information linking device of the industrial vehicle wirelessly transmits the collected movement data to the server 112.

In another exemplary implementation, the industrial vehicle further comprises an environmental-based location tracking device 222 that identifies an absolute position of the industrial vehicle 108 within a limited, defined environment over a third wireless communication link. In this example implementation, the badge communicator 224 of the industrial vehicle 108 tracks the relative position of the operator badge as the operator steps off of the industrial vehicle to perform a pick operation. Moreover, at least one of the information linking device on the industrial vehicle or the server computer computes the absolute position of the operator while off of the industrial vehicle based upon an absolute position of the industrial vehicle as recorded by the environmental-based location tracking device, and the relative position of the vehicle operator tracked by the operator badge communicator.

The system also compares the computed absolute position of the operator to coordinates of a storage location containing the requested pick content, where the coordinate information is extracted from a warehouse management system (e.g., WMS 120 of FIG. 1). Moreover, the system verifies that the operator picked from the correct location based upon the computed operator position and the identified storage coordinates, and transmits a message to an output device on the industrial vehicle if the system determines that the operator picked from the wrong location.

In yet another example implementation using the environmental-based location tracking device 222, the badge communicator 224 of the industrial vehicle tracks the relative position of the operator badge as the operator steps off of the industrial vehicle to perform a pick operation. Here, at least one of the information linking devices on the industrial vehicle or the server computer computes the absolute position of the operator while off of the industrial vehicle based upon an absolute position of the industrial vehicle as recorded by the environmental-based location tracking device, and the relative position of the vehicle operator tracked by the operator badge communicator.

The system identifies a weight of the pick content, where the weight of the pick content is extracted from a warehouse management system (WMS 120 of FIG. 1), a scale on the industrial vehicle, etc. The system uses the computed absolute position of the operator, and the weight of the pick content to determine how far the operator carried the pick content, and thus estimate the work performed by the vehicle operator. Using the inertial sensors on the badge, the badge communicator can also report to the information linking device, any other relevant information, such as the heartrate, body temperature, whether it is determined that the operator had to bend down, how many steps were taken, etc.

The system records the weight in an aggregated total of weight lifted by the vehicle operator over a predetermined time period, e.g., a working shift. Moreover, the system monitors the travel path of the vehicle operator while off of the vehicle during the pick operation, e.g., to record a first distance that the operator traveled to arrive at the storage location, to record a second distance that the operator traveled to return from the storage location carrying the pick content, and compute an amount of work performed by the vehicle operator based upon the first distance, the second distance and the weight of the pick content. The system can also record other information, such as timestamps, and other data extracted from the badge sensors, as set out more fully herein.

In still a further example implementation, the operator badge records, based upon at least one inertial sensor 1906, 1918, 1920 in the operator badge, a number of steps taken by the vehicle operator. The system creates a digitally stored computer record for the vehicle operator based upon information communicated from the operator badge to the operator badge communicator, which tracks the number of steps that the vehicle operator took while off of the industrial vehicle.

As an additional example, the operator badge records, based upon at least one inertial sensor in the operator badge, a number of times the vehicle operator bent over to pick up an item. Here, the system creates a digitally stored computer record for the vehicle operator based upon information communicated from the operator badge to the operator badge communicator, which tracks the number of times that the vehicle operator bent over to pick up an item based upon inertial measurements recorded by the operator badge.

In still another example implementation, the information linking device detects that the vehicle operator is present on the industrial vehicle, records a total amount of time that the vehicle operator is present on the industrial vehicle over a predetermined time interval, records based upon at least one of an inertial measurement from the operator badge, or a seat switch on the industrial vehicle, an amount of time that the vehicle operator was seated while on the industrial vehicle. In response thereto, the system creates a digitally stored computer record for the vehicle operator based upon information communicated from the operator badge to the operator badge communicator, which tracks the amount of time that the vehicle operator is on the industrial vehicle, the amount of time on the industrial vehicle that the operator is standing, and an amount of time on the industrial vehicle that the vehicle operator is sitting.

In still another example, the operator badge further comprises at least one temperature sensor that tracks the body temperature of the vehicle operator by generating temperature data. Here, the badge controller reads the temperature data collected by the temperature sensor and wirelessly transmits the collected temperature data to the operator badge communicator of the industrial vehicle. The badge controller of the industrial vehicle communicates the collected temperature data to the information linking device, and the information linking device of the industrial vehicle wirelessly transmits the collected temperature data to the server.

Similarly, in yet another example, the operator badge further comprises at least one heart rate sensor that tracks the body heart rate of the vehicle operator by generating heart rate data. Here, the badge controller reads the heart rate data collected by the heart rate sensor and wirelessly transmits the collected heart rate data to the operator badge communicator of the industrial vehicle, the badge controller of the industrial vehicle communicates the collected heart rate data to the information linking device, and the information linking device of the industrial vehicle wirelessly transmits the collected heart rate data to the server.

Computer System Overview

Figure 20:
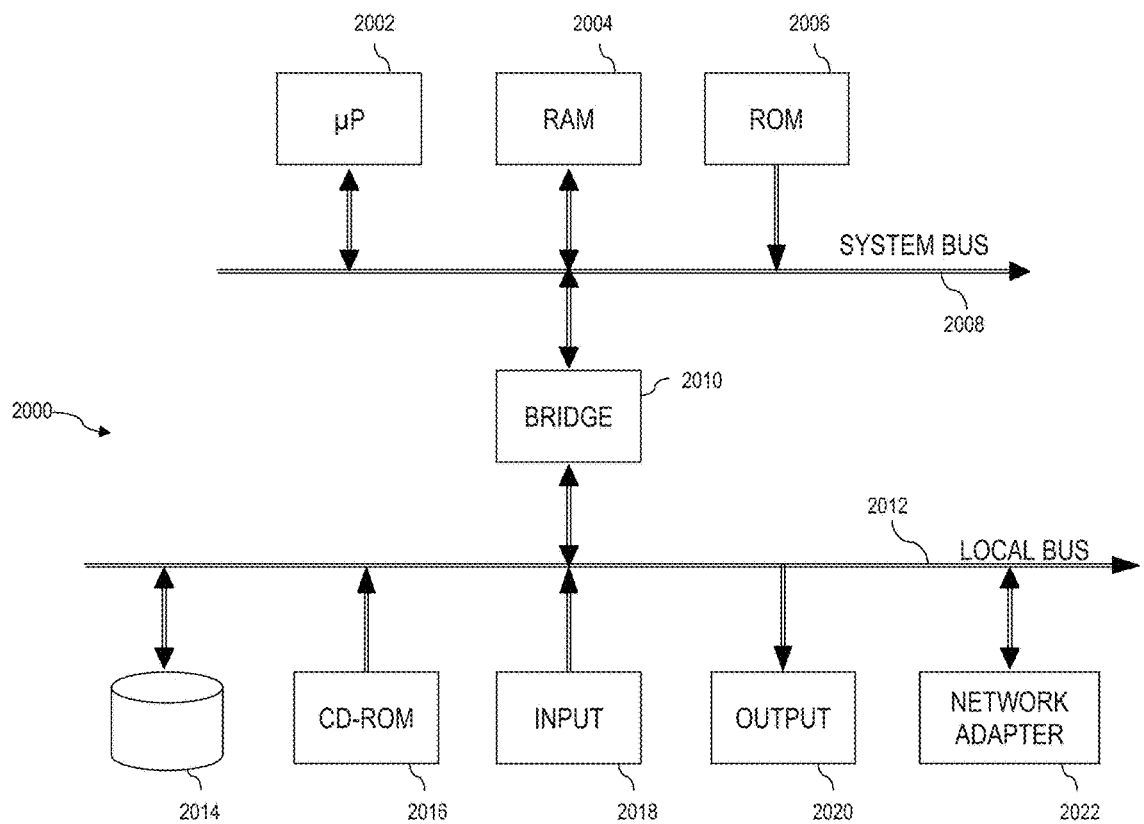
FIG. 20 is a block diagram of a computer processing system capable of implementing any of the systems or processes (or subsets thereof) described more fully herein.

Referring to FIG. 20, a schematic block diagram illustrates an exemplary computer system 2000 for implementing the various processes described herein. The exemplary computer system 2000 includes one or more (hardware) microprocessors (g) 2002 and corresponding (hardware) memory (e.g., random access memory 2004 and/or read only memory 2006) that are connected to a system bus 2008. Information can be passed between the system bus 2008 and bus 2012 by a suitable bridge 2010 to communicate with various input/output devices. For instance, a local bus 2012 is used to interface peripherals with the one or more microprocessors (g) 2002, such as storage 2014 (e.g., hard disk drives); removable media storage devices 2016 (e.g., flash drives, DVD-ROM drives, CD-ROM drives, floppy drives, etc.); I/O devices such as input device 2018 (e.g., mouse, keyboard, scanner, etc.) output devices 2020 (e.g., monitor, printer, etc.); and a network adapter 2022. The above list of peripherals is presented by way of illustration, and is not intended to be limiting. Other peripheral devices may be suitably integrated into the computer system 2000.

The microprocessor(s) 2002 control operation of the exemplary computer system 2000. Moreover, one or more of the microprocessor(s) 2002 execute computer readable code (e.g., stored in the memory 2004, 2006 storage 2014, removable media insertable into the removable media storage 2016 or combinations thereof—collectively or individually, computer-program products) that instructs the microprocessor(s) 2002 to implement the computer-implemented processes herein.

The computer-implemented processes herein may be implemented as a machine-executable process executed on a computer system, e.g., one or more of the processing devices 102 of FIG. 1, on a particular computing device such as the vehicle computer described with reference to FIG. 2, or combination thereof.

Thus, the exemplary computer system or components thereof can implement processes and/or computer-implemented processes stored on one or more computer-readable storage devices as set out in greater detail herein. Other computer configurations may also implement the processes and/or computer-implemented processes stored on one or more computer-readable storage devices as set out in greater detail herein. Computer-program code for carrying out operations for aspects of the present disclosure may be written in any combination of one or more programming languages. The program code may execute entirely on the computer system 2000 or partly on the computer system 2000. In the latter scenario, the remote computer may be connected to the computer system 2000 through any type of network connection, e.g., using the network adapter 2022 of the computer system 2000.

In implementing computer aspects of the present disclosure, any combination of computer-readable medium may be utilized. The computer-readable medium may be a computer readable signal medium, a computer-readable storage medium, or a combination thereof. Moreover, a computer-readable storage medium may be implemented in practice as one or more distinct mediums.

A computer-readable signal medium is a transitory propagating signal per se. A computer-readable signal medium may include computer readable program code embodied therein, for example, as a propagated data signal in baseband or as part of a carrier wave. More specifically, a computer-readable signal medium does not encompass a computer-readable storage medium.

A computer-readable storage medium is a tangible device/hardware that can retain and store a program (instructions) for use by or in connection with an instruction execution system, apparatus, or device, e.g., a computer or other processing device set out more fully herein. Notably, a computer-readable storage medium does not encompass a computer-readable signal medium. Thus, a computer readable storage medium, as used herein, is not to be construed as being transitory signals per se, such as radio waves or other freely propagating electromagnetic waves through a transmission media.

Specific examples (a non-exhaustive list) of the computer-readable storage medium include the following: a hard disk, a random-access memory (RAM), a read-only memory (ROM), an erasable programmable read-only memory (EPROM), Flash memory, a portable computer storage device, an optical storage device such as a compact disc read-only memory (CD-ROM) or digital video disk (DVD), or any suitable combination of the foregoing. In particular, a computer-readable storage medium includes computer-readable hardware such as a computer-readable storage device, e.g., memory. Here, a computer-readable storage device and computer-readable hardware are physical, tangible implementations that are non-transitory.

By non-transitory, it is meant that, unlike a transitory propagating signal per se, which will naturally cease to exist, the contents of the computer-readable storage device or computer-readable hardware that define the claimed subject matter persists until acted upon by an external action. For instance, program code loaded into random access memory (RAM) is deemed non-transitory in that the content will persist until acted upon, e.g., by removing power, by overwriting, deleting, modifying, etc.

Moreover, since hardware comprises physical element(s) or component(s) of a corresponding computer system, hardware does not encompass software, per se.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the disclosure.

Having thus described the invention of the present application in detail and by reference to embodiments thereof, it will be apparent that modifications and variations are possible without departing from the scope of the invention defined in the appended claims.

What is claimed is:

1. A system for controlling an industrial vehicle comprising:
    an information linking device that wirelessly communicates with a server;
    a badge communicator that communicates with electronic badges that are in short range proximity of the industrial vehicle;
    an operator badge that is worn by an operator of the industrial vehicle;
    a controller coupled to memory, wherein the controller executes program code stored in the memory to control the operating state of the industrial vehicle based upon the operator badge, wherein the controller executes the program code to:
        identify that the operator possessing the operator badge has approached the industrial vehicle;
        log the operator onto the industrial vehicle if the operator is determined to be authorized to operate the industrial vehicle;
        communicate with the server via the information linking device to identify that the operator has logged on to operate the industrial vehicle;
        pair the operator badge with the industrial vehicle upon determining that the operator is authorized to operate the industrial vehicle; and
        control the industrial vehicle based upon a location of the operator badge relative to the industrial vehicle to:
            turn on the industrial vehicle where the badge communicator detects that the operator badge is on the industrial vehicle;
            place the industrial vehicle in a standby mode where the badge communicator detects that the operator badge is in proximity to the industrial vehicle, but not on the industrial vehicle; and
            place the industrial vehicle in a stop mode where the badge communicator no longer detects that the operator badge is in proximity to the industrial vehicle.

2. The system of claim 1, wherein the controller is further programmed for:
    locking the industrial vehicle from use by another operator so long as the industrial vehicle is paired with the operator badge and the industrial vehicle is in the standby mode.

3. The system of claim 1, wherein the controller is further programmed for:
    locking the industrial vehicle from use by another operator so long as the industrial vehicle is paired with the operator badge and the industrial vehicle is in the stop mode.

4. The system of claim 1, wherein:
    the operator badge further comprises:
        at least one inertial sensor that tracks movement of the vehicle operator by generating movement data; and
        a badge controller that reads the movement data collected by the inertial sensor and wirelessly transmits the collected movement data to the badge communicator of the industrial vehicle;
    the badge controller of the industrial vehicle communicates the collected movement data to the information linking device; and
    the information linking device of the industrial vehicle wirelessly transmits the collected movement data to the server.

5. The system of claim 1, wherein:
    the industrial vehicle further comprises an environmental based location tracking device that identifies an absolute position of the industrial vehicle within a limited, defined environment over a third wireless communication link;
    the badge communicator of the industrial vehicle tracks the relative position of the operator badge as the operator steps off of the industrial vehicle to perform a pick operation; and
    at least one of the information linking device on the industrial vehicle and the server computer:
        computes the absolute position of the operator while off of the industrial vehicle based upon an absolute position of the industrial vehicle as recorded by the environmental based location tracking device, and the relative position of the vehicle operator tracked by the badge communicator;
        compares the computed absolute position of the operator to coordinates of a storage location containing the requested pick content, where the coordinate information is extracted from a warehouse management system;
        verifies that the operator picked from a correct location based upon the computed operator position and the identified storage coordinates; and
        transmits a message to an output device on the industrial vehicle if the operator picked from a wrong location.

6. The system of claim 1, wherein:
    the industrial vehicle further comprises an environmental based location tracking device that identifies an absolute position of the industrial vehicle within a limited, defined environment over a third wireless communication link;
    the badge communicator of the industrial vehicle tracks the relative position of the operator badge as the operator steps off of the industrial vehicle to perform a pick operation; and
    at least one of the information linking device on the industrial vehicle and the server computer:
        computes an absolute position of the operator while off of the industrial vehicle based upon the absolute position of the industrial vehicle as recorded by the environmental based location tracking device and the relative position of the vehicle operator tracked by the badge communicator;

compares the computed absolute position of the operator to a weight of the pick content, where the weight of the pick content is extracted from a warehouse management system; and records the weight in an aggregated total of weight lifted by the vehicle operator over a predetermined time period.

7. The system of claim 6, wherein the controller further executes program code to:

monitor a travel path of the vehicle operator while off of the vehicle during the pick operation;

record a first distance that the operator traveled to arrive at the storage location;

record a second distance that the operator traveled to return from the storage location; and compute an amount of work performed by the vehicle operator based upon the first distance, the second distance, and the weight of the pick content.

8. The system of claim 1, wherein:

the operator badge is further configured to record into memory of the operator badge a number of steps taken by the vehicle operator, based upon at least one inertial sensor in the operator badge; and the controller is further configured to create a digitally stored computer record for the vehicle operator based upon information communicated from the operator badge to the badge communicator, wherein the information includes the number of steps that the vehicle operator took while off of the industrial vehicle.

9. The system of claim 1, wherein:

the operator badge records, based upon at least one inertial sensor in the operator badge, a number of times the vehicle operator bent over to pick up an item; and the controller creates a digitally stored computer record for the vehicle operator based upon information communicated from the operator badge to the badge communicator, wherein the information includes the number of times that the vehicle operator bent over to pick up an item based upon inertial measurements recorded by the operator badge.

10. The system of claim 1, wherein:

the information linking device:

detects that the vehicle operator is present on the industrial vehicle;

records a total amount of time that the vehicle operator is present on the industrial vehicle over a predetermined time interval;

records an amount of time that the vehicle operator was seated while on the industrial vehicle based upon at least one:

of an inertial measurement from the operator badge, and a seat switch on the industrial vehicle; and creates a digitally stored computer record for the vehicle operator based upon information communicated from the operator badge to the badge communicator, wherein the information includes the amount of time that the vehicle operator is on the industrial vehicle, an amount of time on the industrial vehicle that the operator is standing, and the amount of time on the industrial vehicle that the vehicle operator is sitting.

11. The system of claim 1, wherein:

the operator badge further comprises:

at least one temperature sensor that tracks the body temperature of the vehicle operator by generating temperature data; and a badge controller that reads the temperature data collected by the temperature sensor and wirelessly transmits the collected temperature data to the badge communicator of the industrial vehicle;

the badge controller of the industrial vehicle communicates the collected temperature data to the information linking device; and the information linking device of the industrial vehicle wirelessly transmits the collected temperature data to the server.

12. The system of claim 1, wherein:

the operator badge further comprises:

at least one heart rate sensor that tracks the body heart rate of the vehicle operator by generating heart rate data; and a badge controller that reads the heart rate data collected by the heart rate sensor and wirelessly transmits the collected heart rate data to the badge communicator of the industrial vehicle;

the badge controller of the industrial vehicle communicates the collected heart rate data to the information linking device; and the information linking device of the industrial vehicle wirelessly transmits the collected heart rate data to the server.

* * * * *

UNITED STATES PATENT AND TRADEMARK OFFICE
CERTIFICATE OF CORRECTION

PATENT NO. : 10,198,685 B2
APPLICATION NO. : 15/631567
DATED : February 5, 2019
INVENTOR(S) : Andreas Simon et al.

It is certified that error appears in the above-identified patent and that said Letters Patent is hereby corrected as shown below:

In the Specification

Column 41, Line 37, "processors (g) 2002" should read --processors (µP) 2002--.

Column 41, Lines 43-44, "microprocessors (g) 2002" should read --microprocessors (µP) 2002--.

Signed and Sealed this
Twenty-sixth Day of November, 2019

Andrei Iancu
*Director of the United States Patent and Trademark Office*